US011902222B2

(12) United States Patent
Aharoni et al.

(10) Patent No.: US 11,902,222 B2
(45) Date of Patent: Feb. 13, 2024

(54) UPDATING TRAINED VOICE BOT(S) UTILIZING EXAMPLE-BASED VOICE BOT DEVELOPMENT TECHNIQUES

(71) Applicant: GOOGLE LLC, Mountain View, CA (US)

(72) Inventors: Asaf Aharoni, Ramat Hasharon (IL); Eyal Segalis, Tel Aviv (IL); Ofer Ron, Givatayim (IL); Sasha Goldshtein, Tel Aviv (IL); Tomer Amiaz, Tel Aviv (IL); Razvan Mathias, San Jose, CA (US); Yaniv Leviathan, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 247 days.

(21) Appl. No.: 17/170,300

(22) Filed: Feb. 8, 2021

(65) Prior Publication Data
US 2022/0255885 A1    Aug. 11, 2022

(51) Int. Cl.
*H04L 51/02* (2022.01)
*G06N 20/00* (2019.01)
(Continued)

(52) U.S. Cl.
CPC .............. *H04L 51/02* (2013.01); *G06N 20/00* (2019.01); *G10L 15/063* (2013.01); *G10L 15/10* (2013.01); *G10L 15/22* (2013.01)

(58) Field of Classification Search
CPC ........ H04L 51/02; G06N 20/00; G06N 3/045; G06N 3/006; G06N 3/044; G06N 3/084;
(Continued)

(56) References Cited

U.S. PATENT DOCUMENTS 1,069,897 A1    6/2020 Rajagopal et al.
10,691,897 B1 *  6/2020 Rajagopal ............. G06F 40/284
(Continued)

FOREIGN PATENT DOCUMENTS

CN    108229686    6/2018
GB    2367402      4/2002

OTHER PUBLICATIONS

European Patent Office; International Search Report and Written Opinion of Application No. PCT/US2021/060360; 12 pages; dated Feb. 24, 2022.
(Continued)

*Primary Examiner* — Michael Colucci
(74) *Attorney, Agent, or Firm* — Gray Ice Higdon

(57) ABSTRACT

Implementations are directed to updating a trained voice bot that is deployed for conducting conversations on behalf of a third-party. A third-party developer can interact with a voice bot development system that enables the third-party developer to train, update, validate, and monitor performance of the trained voice bot. In various implementations, the trained voice bot can be updated by updating a corpus of training instances that was initially utilized to train the voice bot, and updating the trained voice bot based on the updated corpus. In some implementations, the corpus of training instances may be updated in response to identifying occurrence(s) of behavioral error(s) of the trained voice bot while the conversations are being conducted on behalf of the third-party. In additional or alternative implementations, the corpus of training instances may be updated in response to determining the trained voice bot does not include a desired behavior.

18 Claims, 11 Drawing Sheets

(51) Int. Cl.
*G10L 15/06* (2013.01)
*G10L 15/10* (2006.01)
*G10L 15/22* (2006.01)

(58) Field of Classification Search
CPC ....... G10L 15/063; G10L 15/10; G10L 15/22; G10L 2015/225; G06F 40/35
See application file for complete search history.

(56) References Cited

U.S. PATENT DOCUMENTS

| | | | |
|---|---|---|---|
| 10,923,109 | B2 | 2/2021 | Chakraborty et al. |
| 11,113,475 | B2 | 9/2021 | Sampat et al. |
| 11,373,131 | B1* | 6/2022 | Venugopal ....... G06Q 10/06395 |
| 2015/0278706 | A1 | 10/2015 | Shivashankar et al. |
| 2017/0300831 | A1* | 10/2017 | Gelfenbeyn ........ G06F 16/3329 |
| 2017/0330077 | A1 | 11/2017 | Williams et al. |
| 2019/0102078 | A1 | 4/2019 | Bhatt et al. |
| 2019/0206393 | A1* | 7/2019 | Fang ................... G10L 15/1815 |
| 2019/0378015 | A1 | 12/2019 | Lin et al. |
| 2020/0090651 | A1 | 3/2020 | Tran et al. |
| 2020/0097544 | A1 | 3/2020 | Alexander et al. |
| 2020/0341970 | A1* | 10/2020 | Rodrigues ............... H04L 51/02 |
| 2020/0342032 | A1* | 10/2020 | Subramaniam ....... G06F 11/322 |
| 2020/0344185 | A1 | 10/2020 | Singaraju et al. |
| 2021/0157989 | A1 | 5/2021 | Orr |
| 2021/0312260 | A1* | 10/2021 | Wu ......................... G06F 40/30 |
| 2022/0107802 | A1* | 4/2022 | Rao ....................... G06F 16/907 |
| 2022/0180857 | A1 | 6/2022 | Aharoni et al. |
| 2022/0230632 | A1* | 7/2022 | Maitra ................. A61B 5/7267 |

OTHER PUBLICATIONS

Gopalakrishnan, K. et al . . . , "Are Neural Open-Domain Dialog Systems Robust to Speech Recognition Errors in the Dialog History? An Empirical Study;" arXiv.org, arXiv.2008.07683v1; 5 pages; dated Aug. 18, 2020.

Daniel, G. Cabot, J. et al.; Xatkit: A Multimodal Low-Code Chatbot Development Framework; in IEEE Access; vol. 8; pp. 15332-15346; dated 2020.

Dialogflow Training; Google Cloud, Wayback Machine dated archive from Nov. 26, 2020; available at: https://web.archive.org/web/20201126044538/https://cloud.google.com/dialogflow/es/docs/training; dated 2020.

* cited by examiner

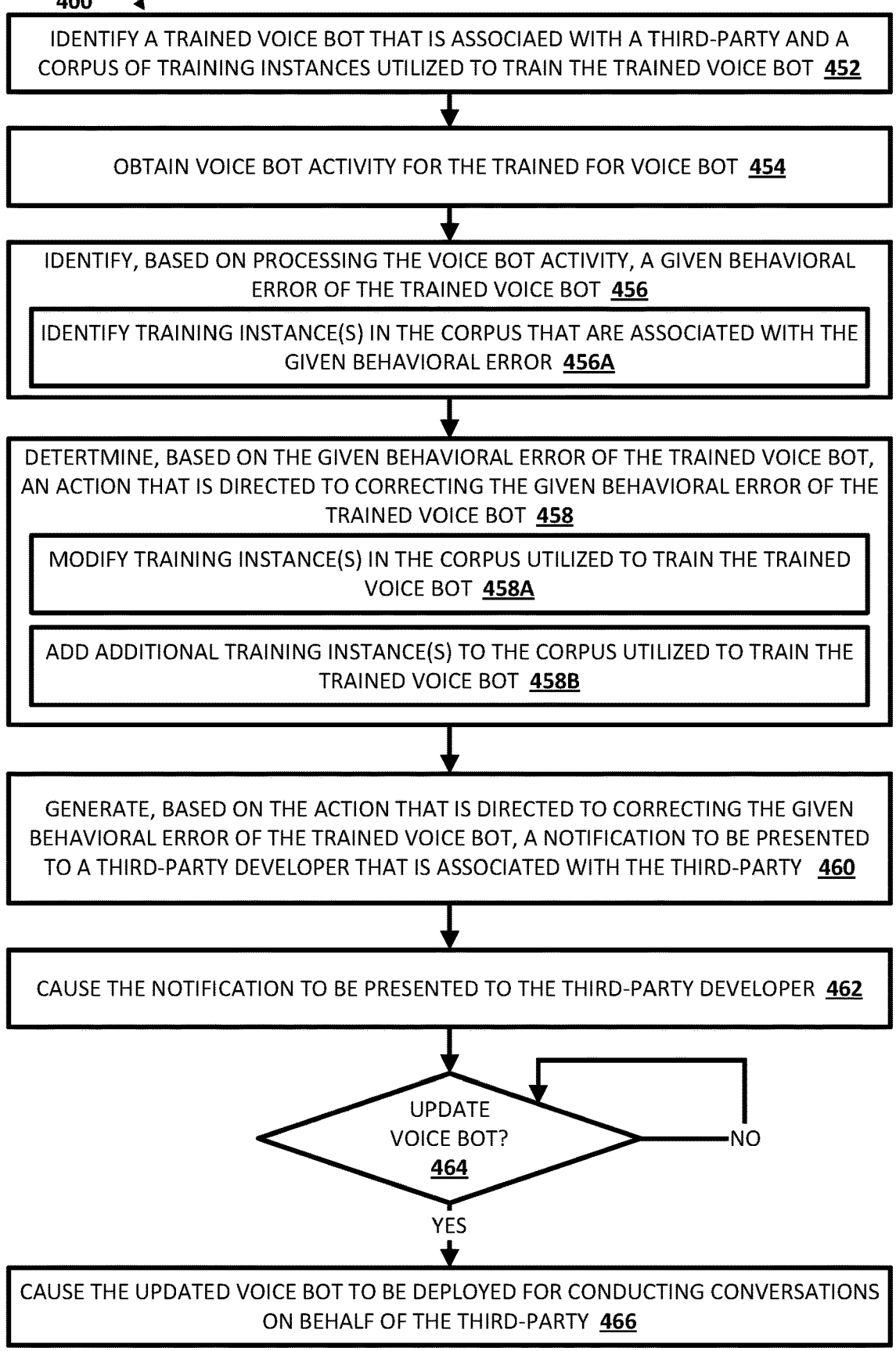

UPDATING TRAINED VOICE BOT(S) UTILIZING EXAMPLE-BASED VOICE BOT DEVELOPMENT TECHNIQUES

BACKGROUND

Humans may engage in human-to-computer dialogs with interactive software applications referred to as "bots", "chatbots," "automated assistants", "interactive personal assistants," "intelligent personal assistants," "conversational agents," etc. via a variety of computing devices. As one example, these bots can initiate telephone calls or answer incoming telephone calls, and conduct conversations with humans to perform action(s) on behalf of a third-party. However, functionality of these bots may be limited by pre-defined intent schemas that the bots utilize to perform the action(s). In other words, if a human that is engaged in a dialog with a bot provides a spoken utterance that includes an intent not defined by the pre-defined intent schemas, then the bot will fail. Further, to update these bots, existing intent schemas may be modified or new intent schemas may be added. However, there are virtually limitless intent schemas that may need to be defined to make the bots robust to various nuances of human speech. Extensive utilization of computational resources is required to manually define and/or manually refine such intent schemas. Further, even if a large quantity of intent schemas are defined, a large amount of memory is required to store and/or utilize the large quantity of intent schemas. Accordingly, intent schemas are not practically scalable to the extent of learning the nuances of human speech.

SUMMARY

Implementations disclosed herein are directed to updating a trained voice bot that is deployed for conducting conversations on behalf of a third-party via a voice bot development platform. The voice bot can correspond to one or more processors that utilize a plurality of machine learning (ML) layers, of one or more ML models, for conducting the conversations on behalf of the third-party. A third-party developer can interact with the voice bot development platform to train, update, validate, and monitor performance of the trained voice bot. In various implementations, the trained voice bot can be updated by updating a corpus of training instances that was initially utilized to train the voice bot, and updating the trained voice bot based on the updated corpus. In some implementations, the corpus of training instances may be updated in response to identifying occurrence(s) of behavioral error(s) of the trained voice bot while the conversations are being conducted on behalf of the third-party. In additional or alternative implementations, the corpus of training instances may be updated in response to determining the trained voice bot does not include a desired behavior. In these and other manners, the voice bot development platform can guide the third-party developer through training, updating, and validating the trained voice bot.

For example, assume the third-party associated with the trained voice bot is a fictitious restaurant entity named Hypothetical Café. Further assume the trained voice bot has conducted a plurality of conversations on behalf of Hypothetical Café with corresponding humans during incoming telephone calls directed to Hypothetical Café for at least restaurant reservations for the corresponding humans. In this example, further assume that the trained voice bot confuses a value for a party size parameter for a given restaurant reservation (e.g., "six" people) with a value for a time parameter for the given restaurant reservation (e.g., "six" PM). This behavioral error may be caused by one or more missing and/or mislabeled features for the training instances utilized to train the trained voice bot associated with Hypothetical Café. In this example, further assume that the trained voice bot fails to solicit a value for a name parameter that is associated with the restaurant reservation. This behavioral error may be caused by a lack of training instances utilized to train the trained voice bot that include the name feature. The voice bot development platform can identify these behavioral errors based on processing the conversation, and can determine one or more actions that are directed to correcting these behavioral errors.

In various implementations, the conversations conducted by the trained voice bot, conversation contexts associated with each of the conversations, embeddings generated during the corresponding conversations, and/or any other information associated with the corresponding conversations can be stored as voice bot activity in a voice bot activity database. The voice bot activity stored in the voice bot activity can be processed, using a plurality of additional ML layers of one or more of the ML models, to identify a given behavioral error of the trained voice bot. For example, one or more portions of a given corresponding conversation and a given conversation context for the one or more portions of the given corresponding conversation can be processed using the plurality of additional ML layers of one or more of the ML models. For instance, a response by the trained voice bot to a spoken utterance provided by a corresponding human can be processed to identify that the trained voice bot incorrectly interpreted a value for a party size feature for a restaurant reservation as a value for a time feature for the restaurant reservation. Further, this behavioral error can be processed, using the additional ML layers of one or more of the ML models, to classify it into one or more disparate categories of behavioral errors. For example, this behavioral error may be classified into a category associated with a missing feature error if the plurality of training instances utilized to initially train the trained voice bot lack a time feature or party size feature, a category associated with a mislabeled feature error if one or more of the plurality of training instances utilized to initially train the trained voice bot incorrectly label a time feature or party size feature, a category associated with a sparsity error if the plurality of training instances utilized to initially train the trained voice bot lack sufficient training instances having a time feature or party size feature, and/or other categories of errors.

In some implementations, one or more training instances that are predicted as causing the given behavioral error can be identified. One or more embeddings associated with the corresponding conversation for which the given behavioral error is identified can be obtained from the voice bot activity database. Further, a corresponding embedding associated with each of the plurality of training instances in the corpus utilized to initially train the trained voice bot can be obtained. One or more of the embeddings associated with the corresponding conversation can be compared, in the embedding space, with the corresponding embedding associated with each of the plurality of training instances to determine a corresponding distance metric associated with each of the plurality of training instances. The corresponding distance metric can be, for example, a cosine similarity distance, a Euclidean distance, and/or other distance metric between one or more of the embeddings and the corresponding embedding. One or more of the training instances associated with corresponding distance metrics that satisfy a threshold can be identified as being a precited cause of the given behavioral error. For example, one or more embeddings associated with the corresponding conversation in which the above noted behavioral error is identified (e.g., incorrectly interpreting the value for the party size feature for the restaurant reservation as the value for the time feature for the restaurant reservation) may be compared to corresponding embeddings associated with one or more of the training instances. As a result, training instances that include time features and/or party size features should be identified as being a predicted cause of the given behavioral error.

In some implementations, one or more actions directed to correcting the given behavioral error can be determined. The one or more actions may be determined based on the one or more disparate categories into which the given behavioral error is identified. For example, if the given behavioral error is classified into a category associated with a missing feature error, then the one or more actions directed to correcting the given behavioral error may include labeling one or more existing training instances in the corpus. As another example, if the given behavioral error is classified into a category associated with a mislabeled feature error, then the one or more actions directed to correcting the given behavioral error may include relabeling one or more existing training instances in the corpus. As yet another example, if the given behavioral error is classified into a category associated with a sparsity error, then the one or more actions directed to correcting the given behavioral error may include synthesizing one or more additional training instances in the corpus and/or requesting the third-party developer add additional training instances in the corpus.

In various implementations, the voice bot development platform can automatically perform one or more of the actions that are directed to correcting the given behavioral error of the trained voice bot. For example, in implementations where the given behavioral error is associated with a missing feature error and/or a mislabeled feature error, the voice bot development platform can label and/or relabel one or more of the training instances that are identified as being a predicted cause of the given behavioral error. For instance, the voice bot development platform can perform one or more natural language understanding operations of one or more terms of the one or more identified training instances to classify one or more of the terms into a particular category of terms (e.g., "6 PM" being associated with a time), and can assign one or more labels (or relabel) to one or more of the terms to add a time feature. As another example, in implementations where the given behavioral error is associated with a sparsity error, the voice bot development platform can synthesize one or more additional training instances. The voice bot development platform can process the voice bot activity to generate the additional training instances based on the conversations conducted by the trained voice bot and/or based on augmenting one or more of the training instances included in the corpus. For instance, the voice bot development platform can convert one or more portions of the corresponding conversation and the conversation context for the corresponding conversation into one or more training instances, label features of the one or more portions of the corresponding conversation, and add those training instances to the corpus. Also, for instance, the voice bot development platform can augment existing training instances by changing values of features for a given training instance, changing the conversation context for a given training instance, and/or otherwise augment existing training instances, and add those training instances to the corpus.

In additional or alternative implementations, the voice bot development platform can generate a notification that prompts the third-party developer to perform one or more of the actions, and cause the notification to be rendered at a client device of the third-party developer. For example, the voice bot development can generate a notification that includes an indication of the given behavioral error, an indication of one or more training instances that are identified as being a predicted cause of the given behavioral error, an indication of one or more actions that are directed to correcting the given behavioral error (and optionally whether the voice bot development platform automatically performed one or more of the actions), and/or other information related to the given behavioral error or related to correcting the given behavioral error. The third-party developer can interact with the voice bot development platform to update the trained voice bot to correct the given behavioral error of the trained voice bot.

In various implementations, and subsequent to one or more of the actions that are directed to correcting the given behavioral error being performed, the trained voice bot can be updated based on at least one or more modified training instances included in the corpus and/or one or more additional training instances that were added to the corpus. In particular, the plurality of ML layers, of one or more of ML models, utilized by one or more of the processors for conducting the conversations on behalf of the third-party can be updated. In some implementations, weights of one or more of the plurality of ML models can be updated based on at least these training instances, whereas weights of one or more of the plurality of ML models can remain fixed. In some implementations, the trained voice bot can be updated in response to receiving user input that is directed to updating the voice bot. In additional or alternative implementations, the trained voice bot can be updated in response to determining one or more conditions are satisfied. The one or more conditions can include, for example, determining a duration of time has lapsed (e.g., every night, every week, and/or other durations of time), determining that no instances of the voice bot are being implemented, determining a quantity of changes to the corpus since last training the voice bot satisfies a quantity threshold, and/or other conditions. The updated voice bot can be subsequently deployed for conducting additional conversations on behalf of the third-party.

In various implementations, and subsequent to the trained voice bot being updated and prior to the updated voice bot being deployed, the updated voice bot can be validated. In some implementations, the voice bot can be validated based on validation training instances that were withheld from being utilized in initially training and/or subsequently updating the voice bot. In some additional or alternative implementations, the voice bot can be validated based on user input from the third-party developer directed to the voice bot development platform to validate the updated voice bot. The updated voice bot can be considered validated when one or more conditions are satisfied that reflect a measured improvement of the updated voice bot as compared to the voice bot that is currently deployed for conducting conversations on behalf of the third-party. For example, the one or more conditions can include validation of one or more a plurality of ML layers or a plurality of additional ML layers that are updated in further training the voice bot, convergence of one or more of the plurality of ML layers or the plurality of additional ML layers that are updated (e.g., zero loss or within a threshold range of zero loss), determination that one or more of the plurality of ML layers or the plurality of additional ML layers performs better (e.g., with respect to precision and/or recall) than the instance of the voice bot currently being utilized (if any), occurrence of training based on at least a threshold quantity of training instances, and/or a duration of training based on the training instances.

By using the techniques described herein, various technical advantages can be achieved. As one non-limiting example, the voice bot development platform enables voice bot behaviors to be easily added or modified by adding new training instances or modifying existing training instances. As a result, voice bots trained using the voice bot development platform described herein are more scalable, and memory consumption is reduced since a large quantity of intent schemas need not be defined. Rather, the plurality of ML layers of one or more of the ML models trained and utilized can be of a smaller memory footprint and can be more robust and/or accurate. Further, the voice bots trained using the voice bot development platform obtain a high level of precision and recall, thereby enabling the conversations to be concluded more quickly and efficiently since the voice bots trained using the voice bot development platform are more able to understand the nuances of human speech and respond accordingly.

The above description is provided as an overview of only some implementations disclosed herein. Those implementations, and other implementations, are described in additional detail herein.

BRIEF DESCRIPTION OF THE DRAWINGS

FIG. 4 depicts a flowchart illustrating an example method updating a trained voice bot, in accordance with various implementations.

DETAILED DESCRIPTION

Figure 1:
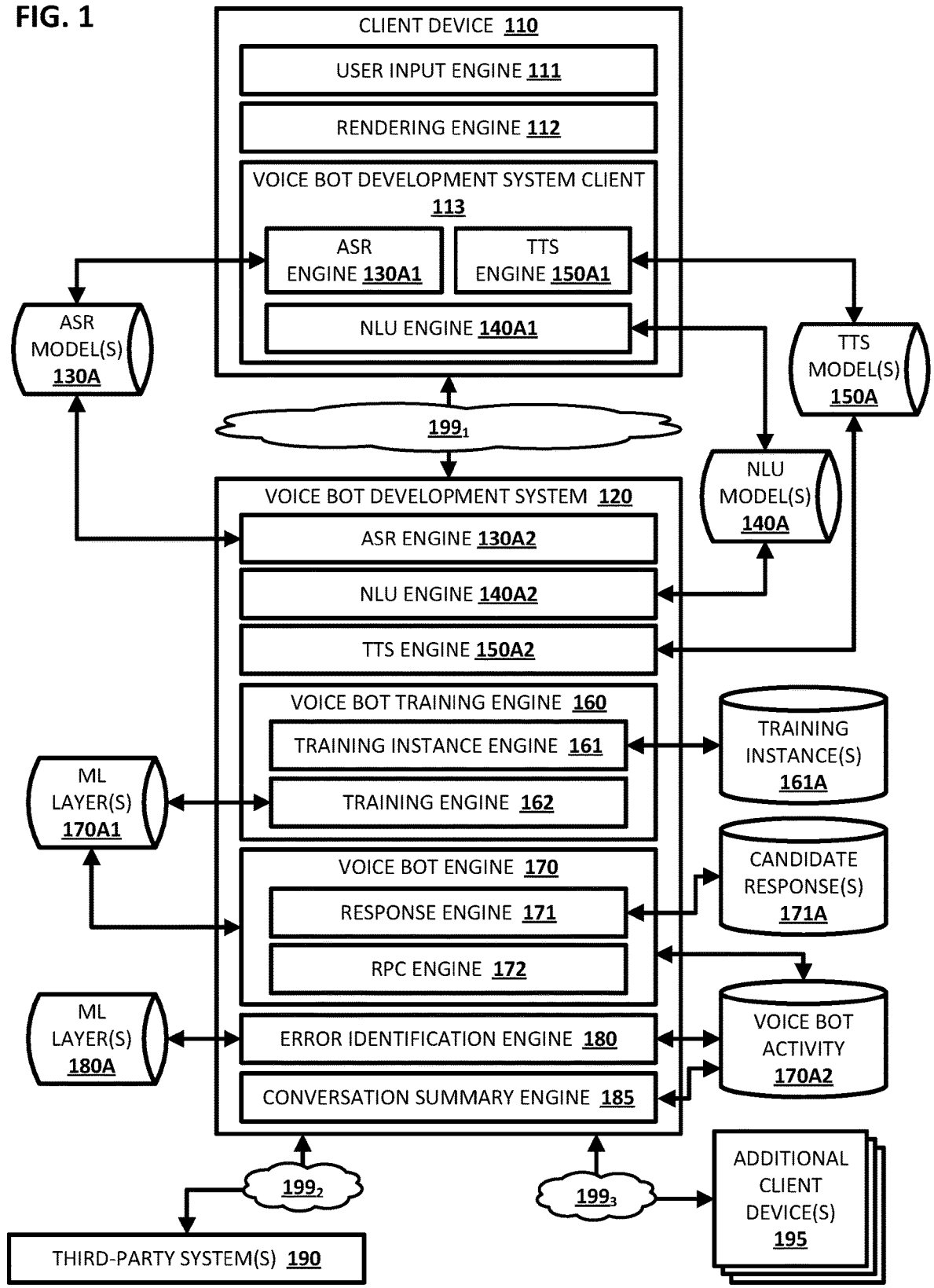
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 111, rendering engine 112, and voice bot development system client 113. The client device 110 can be, for example, a standalone assistant device (e.g., having microphone(s), speaker(s), and/or a display), a laptop, a desktop computer, a tablet, a wearable computing device, a vehicular computing device, and/or any other client device capable of implementing the voice bot development system client 113.

The user input engine 111 can detect various types of user input at the client device 110. The user input detected at the client device 110 can include spoken input detected via microphone(s) of the client device 110, touch input detected via user interface input device(s) (e.g., touchscreen) of the client device 110, and/or typed input detected via user interface input device(s) (e.g., via a virtual keyboard on a touchscreen, a physical keyboard, a mouse, a stylus, and/or any other user interface input device of the client device 110) of the client device 110.

The rendering engine 112 can cause output to be visually and/or audibly rendered at the client device 110 via user interface output. The output can include, for example, various types of user interfaces associated with the voice bot development system client 113 that may be visually rendered via a user interface of the client device 110 (e.g., as described with respect to FIGS. 3A, 3B, and 3C), notifications associated with the voice bot development system client 113 that may be visually rendered via the user interface of the client device 110 and/or audibly via speaker(s) of the client device 110, and/or visually and/or audibly render any other output described herein.

The voice bot development system client 113 can include, in various implementations, an automatic speech recognition (ASR) engine 130A, a natural language understanding (NLU) engine 140A1, and a text-to-speech (US) engine 150A1. Further, the voice bot development system client 113 can communicate with a voice bot development system 120 over one or more networks $199_1$ (e.g., any combination of Wi-Fi, Bluetooth, near-field communication (NFC), local area networks (LANs), wide area networks (WANs), ethernet, the Internet, and/or other networks). The voice bot development system client 113 and the voice bot development system 120 form, from the perspective of a user interacting with the client device 110, a logical instance of a voice bot development platform. Although the voice bot development system 120 is depicted in FIG. 1 as being implemented remotely from the client device 110 (e.g., via one or more servers), it should be understood that is for the sake of example and is not meant to be limiting. For example, the voice bot development system 120 can alternatively be implemented locally at the client device 110.

The voice bot development platform can be utilized by a third-party developer (e.g., a user of the client device 110) to train a voice bot as described herein to be deployed for conducting conversations, on behalf of a third-party associated with the third-party developer, for telephone calls associated with the third-party. Notably, the voice bot development platform can be provided by a first-party, and the third-party developer can utilize the voice bot development platform to train the voice bot for the third-party associated with the third-party developer. As used herein, the term first-party refers to an entity that publishes the voice bot development platform, whereas the term third-party refers to an entity that is distinct from the entity associated with the first-party and did not publish the voice bot development system. Accordingly, a third-party developer refers to a user that interacts with the voice bot development platform to train a voice bot associated with a third-party.

The telephone calls described herein can be performed using various voice communication protocols (e.g., Voice over Internet Protocol (VoIP), public switched telephone networks (PSTN), and/or other telephonic communication protocols. As described herein, synthesized speech can be rendered as part of an assisted telephone call, which can include injecting the synthesized speech into the call so that it is perceivable by at least one of the participants of the assisted telephone call. The synthesized speech can be generated and/or injected by the client device 110 that is one of the endpoints of a given telephone call and/or can be generated and/or injected by a server (e.g., that implements the voice bot development system 120) that is connected to the telephone call.

The voice bot development system 120 includes, in various implementations, ASR engine 130A2, NLU engine 140A2, TTS engine 150A2, voice bot training engine 160, voice bot engine 170, error identification engine 180, and conversation summary engine 185. The voice bot training engine 160 can be utilized to train a voice bot to be deployed for conducting conversations, on behalf of a third-party, for telephone calls associated with the third-party, and can include, in various implementations, training instance engine 161 and training engine 162. Further, the voice bot engine 170 can subsequently utilize the trained voice bot to conduct the conversations, on behalf of the third-party, for the telephone calls associated with the third-party, and can include, in various implementations, a response engine 171 and a remote procedure call (RPC) engine 172.

The training instance engine 161 can obtain a plurality of training instances for training the voice bot based on user input provided by the third-party developer and detected at the client device 110 via the user input engine 111. The plurality of training instances can be stored in training instance(s) database 161A, and in association with an indication of the voice bot to be trained based on the plurality of training instances. Each of the plurality of training instances can include training instance input and training instance output. The training instance input can include one or more of: a portion of a corresponding conversation (e.g., audio data and/or a plurality of speech hypotheses corresponding thereto), a prior context associated with the corresponding conversation, an indication of an incoming telephone call, an action or command to initiate performing of an outgoing telephone call, an RPC inbound request, or one or more feature emphasis inputs. The training instance output can include one or more of: a ground truth response to the portion of the corresponding conversation (e.g., audio data and/or a plurality of speech hypotheses corresponding thereto), an introduction for an incoming telephone call, initiating performance of an outgoing telephone call, or an RPC outbound request.

In some implementations, one or more of the plurality of training instances can be obtained from a corpus of previous telephone calls based on the user input. The third-party developer may need to label one or more of the training instances from the corpus of previous telephone calls via user input. The previous telephone calls can include audio data capturing a corresponding conversation between multiple humans and/or a human and a corresponding voice bot. The training instance engine 161 can process the previous telephone calls to generate one or more of the training instances. For example, assume the previous telephone calls include audio data capturing a corresponding conversation between a human of a first type (e.g., a customer) and a human of a second type (e.g., an employee). In this example, the training instance engine 161 can identify audio data corresponding to portions of the corresponding conversation associated with the customer, and identify audio data corresponding to corresponding responses associated with the employee that are responsive to the portions of the corresponding conversation associated with the customer. The portions of the corresponding conversation associated with the customer can be utilized as part of training instance input, and the corresponding responses associated with the employee can be utilized as part of training instance output. Further, a prior context of the corresponding conversation can also be utilized as part of the training instance input. The prior context of the corresponding conversation can include preceding audio data for the corresponding conversation (and/or a plurality of speech hypotheses corresponding thereto or recognized text corresponding thereto), metadata associated with the conversation (e.g., a location of the customer, a time the corresponding telephone call was initiated, whether values for parameters have been solicited, and so on), and/or other contextual information associated with the previous telephone calls.

In some versions of those implementations, the previous telephone calls may be associated with the third-party for which the voice bot is being trained. For example, assume the third-party is a fictitious retail entity named Hypothetical Market that sells various products. The previous telephone calls can include audio data capturing a corresponding conversation between a human of a first type (e.g., a customer), and one or more of a human of a second type (e.g., an employee of Hypothetical Market), a voice bot associated with Hypothetical Market, or an interactive voice response (IVR) system associated with Hypothetical Market. In some additional or alternative versions of those implementations, the previous telephone calls may be associated with one or more other third-parties that are distinct from the third-party for which the voice bot is being trained. In some further versions of those implementations, the previous telephone calls associated with one or more other third-parties that are obtained by the training instance engine 161 may be restricted to other-third parties that are of the same type of entity as the third-party for which the voice bot is being trained (e.g., retailer entities, airline entities, restaurant entities, school or university entities, supplier entities, shipper entities, government entities, and/or any other type of person, place, or thing). Continuing with the above example, the previous telephone calls utilized to generate the training instances for the voice bot associated with Hypothetical Market may be restricted to those associated with other retailers, and optionally other retailers that sell the same or similar products.

In additional or alternative implementations, one or more of the plurality of training instances can be obtained from a demonstrative conversation conducted based on the user input. The demonstrative conversation can include audio data and/or text capturing a corresponding demonstrative conversation between one or more humans (e.g., that may or may not include the third-party developer). For example, assume the third-party is a fictitious retail entity named Hypothetical Market that sells various products. In this example, a human can provide user input to initiate a corresponding conversation from the perspective of a customer of Hypothetical Market, the human or an additional human can provide subsequent user input from the perspective of an employee of Hypothetical Market, the human can provide further subsequent user input from the perspective of the employee, the human or the additional human can provide yet further subsequent user input from the perspective of the customer, and so on (e.g., as described with respect to FIG. 3B). The training instance engine 161 can process the demonstrative conversation to generate one or more of the training instances in a similar manner described above with respect to the corpus of training instances.

In some additional or alternative implementations, one or more of the plurality of training instances can be obtained directly based on the user input. For example, the third-party developer may define at least a portion of a corresponding conversation to be utilized as training instance input for a given training instance, and may define a ground truth response to the portion of the corresponding conversation to be utilized as training instance output for the given training instance. Further, the third-party developer may optionally define a prior context for the corresponding conversation to also be utilized as part of the training instance input for the given training instance, or a conversation summary of "prior" portions of the corresponding conversation. Notably, although the third-party developer is defining these portions of the conversation, the third-party developer may not need to define an entire conversation like a demonstrative conversation. As a result, the third-party developer can define one or more training instances that are directed to specific portions of conversation, such as soliciting particular values for parameters of a task (e.g., a restaurant reservation task, a flight change task, an inventory check task, and/or any other tasks that may be performed during a corresponding telephone call), performance of a RPC, introductions, and/or other aspects of a corresponding conversation.

In various implementations, one or more corresponding feature emphasis inputs may be associated with the one or more of the plurality of training instances. The one or more corresponding feature emphasis inputs can be, for example, natural language input (e.g., spoken and/or typed) that indicates why one or more portions of a particular training instance are important for training the voice bot, such as one or more of the portions of the training instance input include a time feature, a date features, a name feature, an account number feature, an email address feature, a phone number feature, a pecuniary feature, a quantity feature, a product name feature, a location feature, an RPC request feature, and/or any other feature of training instance input or training instance output for a given training instance. The one or more corresponding feature emphasis may be included in the training instance input for a corresponding training instance, utilized to bias updating of the plurality of ML layers that correspond to the voice bot being trained, and/or utilized as input to a pointer network to identify that causes the voice bot to be attentions to the one or more corresponding feature emphasis inputs. As a result, the trained voice bot can be attentioned to occurrences of these features when the voice bot is subsequently deployed by the third-party to conduct conversations.

In implementations where the one or more corresponding feature emphasis inputs are utilized as input to a pointer network, the one or more corresponding feature emphasis inputs, and the portion of the corresponding conversation (and optionally the prior context of the corresponding conversation) can be processed using the pointer network. One or more tokens of the portion of the corresponding conversation can be labeled with one or more values (e.g., probabilities, log likelihoods, binary values, and/or other values) that indicate whether one or more of the tokens of the portion of the corresponding conversation are included in the one or more corresponding feature emphasis inputs. For example, assume the voice bot being trained is associated with Hypothetical Market, assume the training instance input includes at least a portion of a corresponding conversation corresponding to "I would like to purchase Product X if available", and assume the one or more corresponding feature emphasis inputs are indicative of a product feature and an availability feature. In this example, one or more tokens corresponding to "Product X" and "available" may be associated with values that indicate these features are meaningful to correctly respond to the portion of the corresponding conversation. Further, these values can be utilized as part of the training instance input as labels associated with the portion of the corresponding, as side input in processing the training instance input, and/or in biasing updating of the plurality of ML layers. In other words, by processing the corresponding feature emphasis input(s) using the pointer network, the plurality of ML layers can be attentioned to these particular features of the portion of the corresponding conversation that is utilized as part of the training instance input.

Continuing with the Hypothetical Market example, further assume that the corresponding ground truth response indicates that "Product X" is, in fact, "available" for sale. F Based on this availability, the predicted response may correspond to "It is available", "It is available, would you like to purchase Product X?", etc. In this example, the third-party developer may also provide user input indicative of a corresponding ground truth response that indicates how to respond when "Product X" is "not available" for sale. Based on this unavailability, the third-party developer may cause the voice bot to learn other predicted responses, such as "It is not available", "It is not available, would you like to purchase Product Y instead?", etc. Accordingly, the third-party developer can interact with the voice bot development system 120, such that the voice bot can learn multiple behaviors based on a single training instance that includes the feature emphasis input. As a result, not only does the voice bot learn particular features of the corresponding conversation that are important for the corresponding conversation, but the voice bot can also learn how to respond in scenarios when the particular features of the corresponding conversation for a given training instance differ from those included in the given training instance by interacting with the voice bot development system 120.

By using corresponding feature emphasis input(s) described herein, various technical advantages can be achieved. As one non-limiting example, the voice bot can achieve a given level of accuracy and/or robustness based on a given quantity of training instances by including the corresponding feature emphasis inputs. Absent including the corresponding feature emphasis inputs, a greater quantity of training instances would be required to achieve the given level of accuracy and/or robustness—or the given level of accuracy and/or robustness would not be achievable. As a result, the voice bot may be trained in a more quick and efficient manner, thereby conserving computational resources of the client device utilized to train the voice bot and/or network resources in implementations where the training instances, training losses, and/or other training data are transmitted over one or more networks.

In various implementations, one or more of the plurality of training instances may be RPC training instances. As used herein, RPC training instances include training instances having corresponding training instance input that includes at least a corresponding RPC inbound request and/or corresponding training instance output that includes at least a corresponding RPC outbound request. An RPC outbound request included in the corresponding training instance output may indicate that the voice bot should generate an RPC request, and transmit the RPC request to one or more third-party systems 190 (e.g., reservation systems, inventory systems, status check systems, and/or any other third-party system) via one or more networks 199$_2$. An RPC inbound request included in the corresponding training instance input may indicate that the voice bot should receive a response to the RPC request from one or more of the third-party systems 190 via one or more networks 199₂, and process the response to generate output based on the response. Although network(s) 199₂ are depicted separately from network(s) 199₁ in FIG. 1, it should be understood that is for the sake of clarity and is not meant to be limiting. For instance, network(s) 199₂ and network(s) 199₁ may be the same networks or distinct combinations of networks described herein. Since the RPC requests are not directly associated with the corresponding conversations on which the plurality of training instances for training the voice bot are generated (e.g., not captured directly in spoken or typed input of the conversation), the third-party developer may need to define the RPC outbound requests and the RPC inbound requests for the training instances, a particular third-party system of the one or more third party systems 190 to which the RPC outbound request should be directed, a format of the RPC request, a format of the response to the RPC request, and/or any other information associated with the RPC.

In implementations where the user input engine 111 detects spoken input of a user via microphone(s) of the client device 110 in obtaining the training instances as described above, audio data that captures the spoken input can be processed. In some implementations, the ASR engine 130A1 of the client device 110 can process, using ASR model(s) 130A, the audio data that captures the spoken input. In additional or alternative implementations, the client device 110 can transmit the audio data to the voice bot development system 120 over the network(s) 199₁, and the ASR engine 130A2 can process, using ASR model(s) 130A, the audio data that captures the spoken input. The speech recognition engine(s) 130A1 and/or 130A2 can generate a plurality of speech hypotheses for the spoken input based on the processing of the audio data, and can optionally select a particular speech hypotheses as recognized text for the spoken input based on a corresponding value associated with each of the plurality of speech hypotheses (e.g., probability values, log likelihood values, and/or other values). In various implementations, the ASR model(s) 130A are end-to-end speech recognition model(s), such that the ASR engine(s) 130A1 and/or 130A2 can generate the plurality of speech hypotheses directly using the model. For instance, the ASR model(s) 130A can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms. In other implementations, the ASR model(s) 130A are not end-to-end speech recognition model(s) such that the ASR engine(s) 130A1 and/or 130A2 can instead generate predicted phoneme(s) (and/or other representations). For instance, the predicted phoneme(s) (and/or other representations) may then be utilized by the ASR engine(s) 130A1 and/or 130A2 to determine a plurality of speech hypotheses that conform to the predicted phoneme(s). In doing so, the ASR engine(s) 130A1 and/or 130A2 can optionally employ a decoding graph, a lexicon, and/or other resource(s). In various implementations, a corresponding transcription can be rendered at the client device 110 (e.g., in association with training instance input, training instance output, corresponding feature emphasis input(s), a demonstrative conversation, and/or other aspects of the voice bot development platform).

In some versions of those implementations, the NLU engine 140A1 of the client device 110 and/or the NLU engine 140A2 of the voice bot development system 120 can process, using NLU model(s) 140A, the recognized text generated by the ASR engine(s) 130A1 and/or 130A2 to determine intent(s) included in the spoken input. For example, if the client device 110 detects spoken input of "add training instance input of 'do you have any reservations at 6:30 PM for two people'" from the third-party developer (e.g., as part of standalone spoken input defining a training instance input), the client device 110 can process, using the ASR model(s) 130A1 and/or 130A2, audio data that captures the spoken input to generate recognized text corresponding to the spoken input, and can process, using the NLU model(s) 140A, the recognized text to determine at least an intent of adding training instance input (e.g., that may include the audio data and/or the corresponding speech hypotheses for the spoken input).

In some versions of those implementations, the TTS engine 150A1 of the client device 110 and/or the TTS engine 150A2 of the voice bot development system 120 can generate synthesized speech audio data that captures synthesized speech. The synthesized speech can be rendered at the client device 110 using the rendering engine 112 and via speaker(s) of the client device 110. The synthesized speech may capture any output generated by the voice bot development described herein, and may include, for example, an indication that a training instance has been added (or repeat the particular training instance input, training instance output, feature emphasis input(s), etc.), a notifications that requests the third-party developer add one or more additional training instances or a group of training instances (and optionally those associated with particular feature(s)), a notifications that requests the third-party developer modify one or more existing training instances or a ground of training instances (and optionally those associated with particular feature(s)), an indication that training of the voice bot has been initiated, completed, or a status update on training of the voice bot, and/or any other information related to the voice bot or the voice bot development platform that can be audibly conveyed to the third-party developer.

The training engine 162 can utilize the plurality of training instances obtained by the training instance engine 161 (e.g., stored in the training instance(s) database 161A) to train the voice bot (e.g., ML layer(s) thereof). The voice bot can correspond to one or more processors that utilize a plurality of machine learning (ML) layers of one or more ML models (e.g., stored in ML layer(s) database 170A1) for conducting conversations, on behalf of the third-party, for telephone calls associated with the third-party. The plurality of ML layers may correspond to those of transformer ML models (e.g., input layers, encoding layers, decoding layers, feed-forward layers, attention layers, output layers, and/or other ML layers), unidirectional and/or bidirectional RNN models (e.g., input layers, hidden layers, output layers, and/or other ML layers), and/or other ML layers of other ML models.

Figure 2:
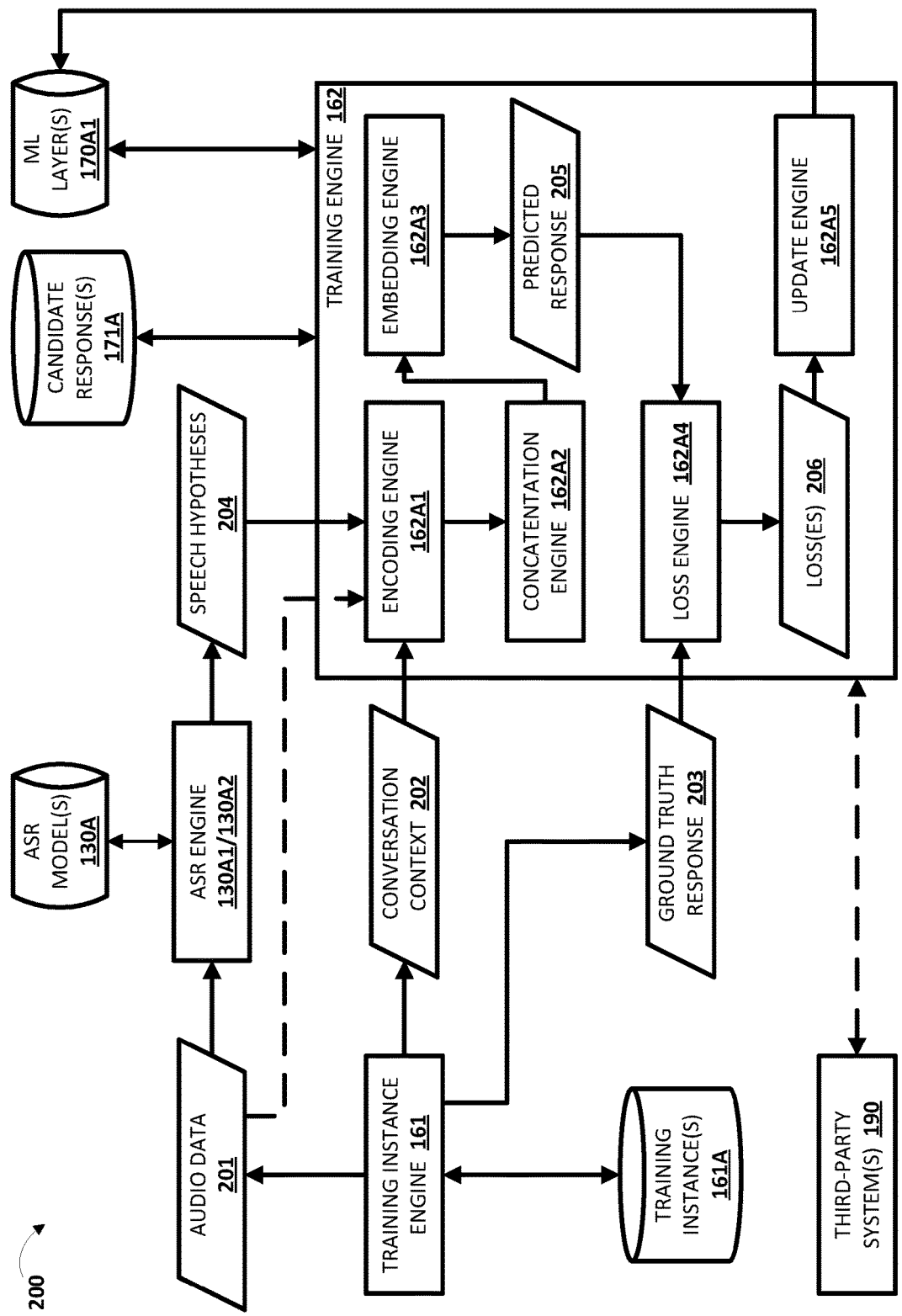
FIG. 2 depicts an example process flow for training a voice bot, in accordance with various implementations.

For example, and referring to FIG. 2, an example process flow 200 for training a voice bot is depicted. In some implementations, training instance engine 161 can obtain a given training instance, from among a plurality of training instances associated with the voice bot stored in the training instance(s) database 161A. In some implementations, training instance input, for the given training instance, can include at least audio data 201 corresponding to a portion of a corresponding conversation and a conversation context 202 for the corresponding conversation. Further, training instance output, for the given training instance, can include a ground truth response 203 to the portion of the conversation. The audio data 201 can be processed by the ASR engine(s) 130A1 and/or 130A2, using the ASR model(s) 130A, to generate a plurality of speech hypotheses 204. In other implementations, the training instance input may include the plurality of speech hypotheses 204 generated based on the audio data 201, but may not include the audio data 201 itself.

In some implementations, the encoding engine 162A1 can process, using first ML layers of a plurality of ML layers stored in the ML layer(s) database 170A1, the plurality of speech hypotheses 204 to generate a first encoding. The encoding engine 162A1 can process, using the first ML layers of second ML layers of the plurality of ML layers stored in the ML layer(s) database 170A1, the conversation context 202 to generate a second encoding. Further, concatenation engine 162A2 can concatenate the first encoding and the second encoding to generate a concatenated encoding. The concatenated encoding may represent a current state of the corresponding conversation. For example, the concatenated encoding can encode the history of the conversation and a most recent portion of the conversation to encode the entire conversation as a whole.

By encoding the current state of the corresponding conversation, a dialog of the conversation may be tracked, thereby enabling the voice bot to model and/or learn states of the corresponding conversation. Accordingly, the resulting trained voice bot may learn to solicit corresponding values for parameter(s) associated with a task being performed via the corresponding telephone call. For example, assume the training instance input includes at least a portion of a corresponding conversation corresponding to "Hello, do you have any of Product X available for sale". In this example, the voice bot is trained to understand the human is requesting an inventory check for Product X. Further, by encoding the conversation context 202 of the corresponding conversation, the voice bot is also trained to understand that, if Product X is available, the human has not provided any corresponding values for a name parameter associated with the purchase or place Product X on hold, for a pecuniary parameter associated with the purchase of Product X, for an address parameter if the human desires to have Product X shipped to his or her residence, and so on. Thus, the voice bot can be trained to subsequently prompt the human for the corresponding values for one or more of these parameters by tracking the state of the dialog.

Moreover, embedding engine 162A3 can process the concatenated encoding, using one or more of the plurality of ML layers, to generate a predicted embedding associated with a predicted response 205 (e.g., performing an RPC with the third third-party system(s), synthesized speech or text to be provided responsive to the training instance input, answering an incoming telephone call, initiating an outgoing telephone call, and/or other responses that are predicted to be responsive to the training instance input). The predicted response 205 may be selected from a plurality of candidate response in a candidate response(s) database 171A (e.g., that includes the ground truth response 203 and a plurality of additional candidate responses). In generating the predicted embedding, a size of the concatenated encoding may be reduced to a fixed dimensionality. This enables the predicted embedding associated with the predicted response 205 to be easily compared, in embedding space, to other embeddings described with respect to loss engine 162A4.

In some versions of those implementations, and prior to processing of the plurality of speech hypotheses 204, the training engine 162 can cause the plurality of speech hypotheses to be aligned. For example, assume the plurality of speech hypotheses capture spoken input of "for 4 PM". In this example, the plurality of speech hypotheses can be aligned as [for, #empty, 4 PM; for, 4, PM; four, four, PM], such that each of the plurality of aligned speech hypotheses can be subsequently processed in combination with one another. In some further versions of those implementations, the training engine 162 can further cause the plurality of aligned speech hypotheses to be annotated. Continuing with the above example, the plurality of aligned speech hypotheses can be annotated as [for, #empty (@null), 4 PM (@time); for, 4 (@time), PM (@time); four (@time), four (@time), PM (@time)].

In implementations where the training instance input also includes the audio data 201, the encoding engine 162A1 can generate, in addition to or lieu of the encoding generated based on the plurality of speech hypotheses, an encoding associated with the audio data 201. In these implementations, the concatenation engine 162A2 can process the encoding associated with the audio data 201 and the encoding associated with the conversation context 202 to generate a concatenated encoding. Further, the embedding engine 162A3 can process the concatenated encoding, using one or more of the plurality of ML layers, to generate the predicted embedding associated with the predicted response 205. In various implementations, and although not depicted in FIG. 2, the encoding engine 162A1 may additionally process one or more corresponding feature emphasis inputs associated with the given training instance along with the audio data 201 and/or the plurality of speech hypotheses 204.

Although the encoding engine 162A1, the concatenation engine 162A2, and the embedding engine 162A3 are described herein as performing particular functions in a particular order, it should be understood that performance of these particular may be re-ordered, and/or one or more of these engines may be omitted. For example, the encoding engine 162A1 may be omitted, and the embedding engine 162A3 can process the plurality of speech hypotheses 204 and the conversation context 202, using respective ML layers of the plurality of ML model(s), to generate the predicted embedding associated with the predicted response to at least the portion of the corresponding conversation associated with the plurality of speech hypotheses.

Further, the loss engine 162A4 can, in various implementations, compare, in embedding space, the predicted embedding associated with the predicted response 205 to a ground truth embedding associated with the ground truth response 203 to generate one or more losses 206. The predicted embedding and the ground truth embedding can correspond to lower dimensional representations of the predicted response 205 and the corresponding ground truth response 203, respectively. The embedding space allows for comparison of these lower dimensional embeddings. Further, the predicted embedding associated with the predicted response 205 should be close, in the embedding space, to the corresponding ground truth embedding associated with the corresponding ground truth response 203. In other words, in processing at least the portion of the corresponding conversation and the prior context of the conversation, the system should predict a response similar to an actual response to at least the portion of the corresponding conversation. For example, a distance metric (e.g., a cosine similarity distance, a Euclidean distance, and/or other distance metrics) between the predicted embedding and the corresponding ground truth embedding, in the embedding space, can be determined, and one or more of the losses 206 can be generated based on the distance metric.

In some implementations, the ground truth embedding associated with the ground truth response 203 can be generated, while training the voice bot based on the given training instance, using distinct ML layers of a distinct ML model (not depicted) that are distinct from the plurality of ML layers utilized in generating the predicted embedding associated with the predicted response 205 (e.g., dot product architecture). The ground truth embedding may then be stored in the candidate response(s) database 171A to be utilized as one of a plurality of candidate responses at inference. Notably, the distinct ML layers may additionally or alternatively be updated based on one or more of the losses 206 such that the distinct ML layers learn the respective portion(s) of the embedding space to assign to the ground truth embeddings. Moreover, corresponding embeddings associated with one or more responses that are incorrect responses to the portion of the corresponding conversation may additionally or alternatively be utilized as negative examples to further distinguish, in the embedding space, the correct embeddings for the portion of the corresponding conversation. Subsequent to updating of the distinct ML layers, a plurality of additional candidate responses can be processed, using the updated distinct ML layers, to generate corresponding candidate response embeddings. These candidate response embeddings and the corresponding candidate responses can also be stored in the candidate response(s) database 171A even though they were not utilized in training the voice bot. Accordingly, at inference, the distinct ML layers may be omitted since the candidate response embeddings and the corresponding candidate responses are known. In additional or alternative implementations, the ground truth embedding can be stored in association with the ground truth response for the given training instance in the training instance(s) database 161A.

Update engine 162A5 can cause one or more of the plurality of ML layers to be updated based on one or more of the losses 206. For example, the update engine 162A5 can cause one or more of the losses 206 to be backpropagated across one or more of the plurality of ML layers to update respective weights of one or more of the plurality of ML layers. In some implementations, the update engine 162A5 can utilize one or more of the corresponding feature emphasis inputs for the given training instance to bias updating one or more of the plurality of ML layers. For example, prior to updating the respective weights of one or more of the plurality of ML layers, the loss engine 162A4 or the update engine 162A5 can weight one or more of the losses. As a result, one or more of the plurality of ML layers can be attentioned to subsequent occurrences of the one or more of the corresponding feature emphasis inputs.

The one or more of the plurality of ML layers can be further updated based on an additional training instance(s) obtained by the training instance engine 161 in the same or similar manner described above. In some implementations, the voice bot may be trained in this manner until one or more conditions are satisfied. The one or more conditions can include, for example, validation of one or more of the plurality of ML layers or the plurality of additional ML layers that are updated, convergence of one or more of the plurality of ML layers or the plurality of additional ML layers that are updated (e.g., zero loss or within a threshold range of zero loss), determination that one or more of the plurality of ML layers or the plurality of additional ML layers performs better (e.g., with respect to precision and/or recall) than the instance of the voice bot currently being utilized (if any), occurrence of training based on at least a threshold quantity of training instances, and/or a duration of training based on the training instances.

Although the voice bot is described as being trained in a particular manner and using a particular architecture, it should be understood that is for the sake of example and is not meant to be limiting. For example, in training the voice bot associated with Hypothetical Market, a voice bot associated with a fictitious restaurant named Hypothetical Café can be utilized as a baseline voice bot. In this example, one or more transfer learning techniques (e.g., meta learning) may be utilized to adapt the voice bot associated with Hypothetical Café (or output generated based on those training instances) for the voice bot associated with Hypothetical Market. For instance, the training instance input may include an additional input that indicates the voice bot associated with Hypothetical Market is being trained for a different, retail related purposes, whereas the original voice bot associated with Hypothetical Café was trained for restaurant purposes.

Referring briefly back to FIG. 1, and subsequent to training the voice bot, the voice bot engine 170 can cause subsequently utilize the trained voice bot to conduct the conversations, on behalf of the third-party, for the telephone calls associated with the third-party, and can include, in various implementations, a response engine 171 and a remote procedure call (RPC) engine 172. The trained voice bot can conduct the telephone calls with a human or an additional voice bot, that initiated an incoming telephone call or that answered an outgoing telephone call, via respective additional client devices 195. The telephone calls can be conducted over one or more of networks $199_3$ using voice communication protocols (e.g., Voice over Internet Protocol (VoIP), public switched telephone networks (PSTN), and/or other telephonic communication protocols. Notably, these calls may be cloud-based telephone calls, such that the client device 110 utilized in training the voice bot is not an endpoint of the corresponding telephone calls. Rather, the voice bot development system 120 (e.g., one or more servers) may serve as an endpoint of the telephone call along with one of the additional client devices 195.

For example, assume the third-party for which the voice bot is trained is a fictitious retail entity named Hypothetical Market that sells various products. Further assume a human provides user input at a respective one of the additional client devices 195 to initiate a telephone call with Hypothetical Market, the voice bot answers the incoming telephone call initiated by the human, and causes synthesized speech audio data (e.g., generated using the TTS model(s) 150A) that captures synthesized speech corresponding to a particular introduction for the voice bot to be audibly rendered at the respective one of the additional client devices 195 such that the synthesized speech is perceivable to the human via speaker(s) of the respective one of the additional client devices 195. Further assume the human provides a spoken utterance of "Hello, do you have any of Product X available for sale" in response to the audible rendering of the synthesized speech audio data. The spoken utterance may be captured in audio data that is transmitted to the voice bot development system 120 of FIG. 1 over one or more of the networks.

The ASR engine 130A2 can process the audio data, using the ASR model(s) 130A, to generate a plurality of speech hypotheses corresponding to the spoken utterance. The voice bot engine 170 can optionally cause the plurality of speech hypotheses to be aligned and/or annotated. Further, the response engine 171 can process, using a plurality of ML layers stored in the ML layer(s) database 170A1, one or more of the plurality of speech hypotheses, conversation context for the incoming telephone call initiated by the human (e.g., stored in a voice activity database 170A2), and/or the audio data to generate a response embedding. In some implementations, the audio data may only be processed by the ASR engine 130A2 and/or the plurality of speech hypotheses may only be processed by the response engine 171 in response to determining that the spoken utterance provided by the user is complete. For example, the voice bot development system 120 can process the audio data, using endpoint model(s) that are trained to detect when the human is done providing spoken utterances, to determine that the human is done providing the spoken utterance after speaking the word "sale".

In some implementations, the response engine 171 can compare the response embedding to a plurality of candidate response embeddings associated with the plurality of candidate responses stored in the candidate response(s) database 171A. Moreover, the response engine 171 can select a given one of the plurality of candidate responses as a response to the spoken utterance based on a distance metric, in embedding space, between the response embedding and one or more of the plurality of candidate response embeddings associated with the plurality of candidate responses. For example, the candidate response associated with a corresponding distance metric that satisfies a distance threshold may be selected as the response. The response can be processed by the TTS engine 150A2, using the TTS model(s) 150A, to generate synthesized speech audio data that captures the response. Further, the synthesized speech audio data can be audibly rendered at the respective one of the additional client devices 195.

In some implementations, the response engine 171 can determine that an RPC request is required to respond to the spoken utterance captured in the audio data. In some versions of those implementations, the RPC engine 172 can generate an RPC outbound request, and transmit the RPC outbound request to one or more third-party systems 190. Continuing with the above example, the response engine 171 may determine that an RPC request is required to determine whether Hypothetical Market has any inventory of "Product X" for sale. Accordingly, the RPC engine 172 can generate a structured request (e.g., inventory=Product X, intent=sale) as the RPC outbound request that is transmitted to an inventory third-party system 190. The RPC engine 172 can receive, responsive to the RPC outbound request, an RPC inbound request. For example, the RPC inbound request may indicate that "Product X" is either available or unavailable for sale via Hypothetical Market. In implementations where the response engine 171 determines that an RPC request is required, one or more instances of the synthesized speech audio data associated with the RPC outbound request (e.g., "hold on a second while I check") and/or one or more instances of the synthesized speech audio data associated with the RPC inbound request (e.g., "yes, we have Product X available for sale, would you like to purchase it?") can be rendered at the respective one of the additional client devices 195 in the same or similar manner described above.

This process may be repeated to generate corresponding responses for spoken utterances provided by the human until the telephone call is completed. The telephone call with the human may be stored in the voice activity database 170A2. For example, the voice activity database 170A2 may include, for a given telephone call, audio data corresponding to the spoken utterances of the human, synthesized speech audio data corresponding to the synthesized speech of the voice call, a result of the given telephone call, a duration of the given telephone call, a time and/or date associated with the given telephone call, and/or other information derived from the given telephone call. In some implementations, the voice bot may solicit consent from the human to interact with the voice bot prior to engaging in the conversation. In implementations where the human consents to engaging in the conversation with the voice during the telephone call, the voice bot may engage in the conversation with the user. In implementations where the human does not consent to engaging in the conversation with the voice during the telephone call, the voice bot may end the telephone call or request that an additional human that is associated with the third-party join the telephone call.

In various implementations, the error identification engine 180 can process, using a plurality of ML layers of a ML model stored in ML layer(s) database 180A (or a plurality of rules stored in the ML layer(s) database 180A), voice bot activity stored in the voice bot activity database 170A2 to identify any behavioral errors of the voice bot. For example, the error identification engine 180 can process one or more portions of a corresponding conversation and/or a corresponding conversation context for one or more of the portions of the corresponding conversation that was conducted by a trained voice bot that is associated with the third-party. The behavioral errors of the trained voice bot can be identified, for the corresponding conversation, based on processing one or more portions of the corresponding conversation and/or the corresponding conversation context.

In some implementations, the identified behavioral errors can be classified into one or more disparate categories of errors based on output generated using the plurality of ML layers that is indicative of the behavioral error. The behavioral errors can include, for example, the voice bot terminating the call prematurely, the voice bot failing to provide a response and timing out, the voice bot failing to solicit corresponding values for parameters needed to complete a desired action of the human, the voice bot failing to recognize corresponding values for parameters that were provided by the human to complete a desired action of the human, the voice bot failing to perform a RPC when needed, the voice bot performing a RPC with an incorrect third-party system, and/or any other behavioral error of that voice bot that may occur during the corresponding telephone calls. Further, these behavioral errors can be processed, using a plurality of additional ML layers of the ML model or an additional ML model stored in ML layer(s) database 180A, to classify the given behavioral error into one or more disparate categories of errors. For example, the voice bot failing to solicit corresponding values for parameters needed to complete a desired action of the human may be classified into a category associated with a sparsity error, the voice bot failing to recognize corresponding values for parameters that were provided by the human to complete a desired action of the human may be classified into a category associated include a missing or mislabeled feature error, the voice bot failing to perform an RPC when needed or the voice bot performing an RPC with an incorrect third-party system may be classified into a category associated with RPC errors, and so on. In other words, the identified behavioral errors can be classified into the one or more of the same disparate categories of errors if a root cause of the identified behavioral error is the same. Identifying and classifying behavioral errors of the voice bot is described below (e.g., with respect to FIGS. 3C, 3D, and 3E).

In some implementations, the error identification engine 180 can cause the voice bot development system 120 to automatically perform one or more actions to correct these identified behavioral issues. The one or more actions can include, for example, synthesizing additional training instances to be added to a corpus of training instances for updating of the voice bot and/or modifying existing training instances in the corpus by labeling missing features and/or to relabeling mislabeled features for updating the voice bot. For example, the error identification engine 180 may determine that the voice bot has confused multiple features included in portions of a corresponding conversation, but there is a sparsity issue in training instances that includes these features that prevents the voice bot from being able to consistently distinguish the multiple features. In this example, the error identification engine 180 may cause the voice bot development system 120 generate synthetic training instances that include one or more of the multiple features to address the sparsity issue, and cause the voice bot to be updated based on the plurality of training instances associated with the voice bot, including the generated synthetic training instances. As another example, the error identification engine 180 may cause the voice bot development system 120 to additionally or alternatively, relabel one or more existing training instances to further distinguish one or more of the multiple features. Causing the voice bot development system 120 to automatically perform one or more actions directed to correcting identified behavioral errors of the trained voice bot is described below (e.g., with respect to FIGS. 3C, 3D, 3E, 4, 5, and 6). In some versions of those implementations, the error identification engine 180 can cause the voice bot development system 120 to generate a notification to be presented to the third-party developer that at least indicates one or more actions were automatically performed to correct any identified behavioral errors of the trained voice bot.

In some additional or alternative implementations, the error identification engine 180 can cause the voice bot development system 120 to generate a notification to be presented to the third-party developer that requests the third-party developer should perform one or more actions directed to correcting any identified behavioral error of the trained voice bot. The notification can be rendered along with the conversation summary for the corresponding call, or via a separate interface (e.g., a pop-up notification, a notifications interface, a vice bot behavioral error interface, etc.). The one or more actions can include, for example, adding additional training instances to the corpus for updating the voice bot (and optionally training instances of a particular type or having a particular feature) and/or modifying existing training instances for updating the voice bot. For example, the error identification engine 180 can cause the voice bot development system 120 to present one or more training instances, and prompt the third-party developer to identify one or more corresponding feature emphasis inputs for one or more of the multiple training instances, add more training instances that include particular features or are a particular type of training instance, relabel the training instances that may include one or more incorrect labels, and/or any other action that may correct the root cause of the identified behavioral errors (e.g., with respect to FIGS. 3C, 3D, 3E, 4, 5, and 6).

The conversation summary engine 185 can generate, based on the voice bot activity stored in the voice bot activity database 170A2, a corresponding conversation summary for each of the telephone calls conducted by the voice bot. The corresponding conversation summaries can be rendered at a user interface of the client device 110 using the rendering engine 112. In some implementations, the corresponding conversation summary can include, for example, a natural language summary of each of a corresponding telephone call, a duration of the corresponding telephone call, a result or outcome of the corresponding telephone call, pecuniary information associated with the corresponding telephone call, and/or other information associated with the telephone call. Continuing with the Hypothetical Market example, the corresponding conversation summary may be, for example, "user called to inquire about availability of Product X, I checked to make sure Product X was available, the user purchased Product X for $100". In some additional or alternative implementations, the corresponding conversation summary, when selected, may cause a transcription of the corresponding telephone call to be rendered at the user interface of the client device 110 using the rendering engine 112. The corresponding conversation summaries are described below (e.g., with respect to FIG. 3C).

Accordingly, the voice bot development platform described herein enables the third-party developer associated with the third-party to train a voice bot, monitor performance of the voice bot, and subsequently update the voice bot based on any identified behavioral errors of the voice bot. Notably, the voice bot development platform is example-based in that the voice bot is trained based on portions of conversations, and the voice bot is updated based on adding more examples or modifying existing examples. As a result, the third-party developer need not have any extensive knowledge of ML or how to define various intent schemas, which may be required to develop a rules-based voice bot. However, various techniques described herein may also be utilized for training, monitoring, and updating rules-based voice bots.

By using the techniques described herein, various technical advantages can be achieved. As one non-limiting example, the voice bot development platform enables voice bot behaviors to be easily added or modified by adding new training instances or modifying existing training instances. As a result, voice bots trained using the voice bot development platform described herein are more scalable, and memory consumption is reduced since a large quantity of intent schemas need not be defined. Rather, the plurality of ML layers of one or more of the ML models trained and utilized can be of a smaller memory footprint and can be more robust and/or accurate. Further, the voice bots trained using the voice bot development platform obtain a high level of precision and recall, thereby enabling the conversations to be concluded more quickly and efficiently since the voice bots trained using the voice bot development platform are more able to understand the nuances of human speech and respond accordingly.

Although the voice bots are described herein as being subsequently deployed for conducting conversations, on behalf of a third-party, for telephone calls associated with the third-party, it should be understood that is for the sake of example and is not meant to be limiting. For example, the voice bots described herein can be deployed in any scenario in which a human can engage in a human-to-computer dialog with a given voice bot. For instance, the given voice bot can be trained to conduct conversations with humans at a drive thru via a drive thru system, conduct conversations with humans as an automated assistant via a client device of the human, and/or any other domain outside of telephone calls where a human can engage in a human-to-computer dialog with a given voice bot. Accordingly, it should be understood that the behavior of these voice bots may be based on the training instances utilized to train the corresponding voice bots.

Turning now to FIGS. 3A, 3B, 3C, 3D, and 3E various non-limiting examples of a user interface 300 associated with a voice bot developer platform are depicted. A third-party developer can interact with the voice bot development platform using a client device that includes a voice bot development system client or a voice bot development system (e.g., the client device 110 of FIG. 1). By interacting with the voice bot development platform, the third-party developer can train a voice bot that, when deployed, can conduct conversations, on behalf of a third-party associated with the third-party developer, for incoming telephone calls directed to the third-party and/or outgoing telephone calls initiated by on behalf of the third-party. For the sake of example throughout FIGS. 3A, 3B, and 3C, assume the third-party developer is creating a new voice bot to conduct conversations for telephones calls and/or a drive thru associated with Hypothetical Café—a fictitious restaurant.

Figure 3A:
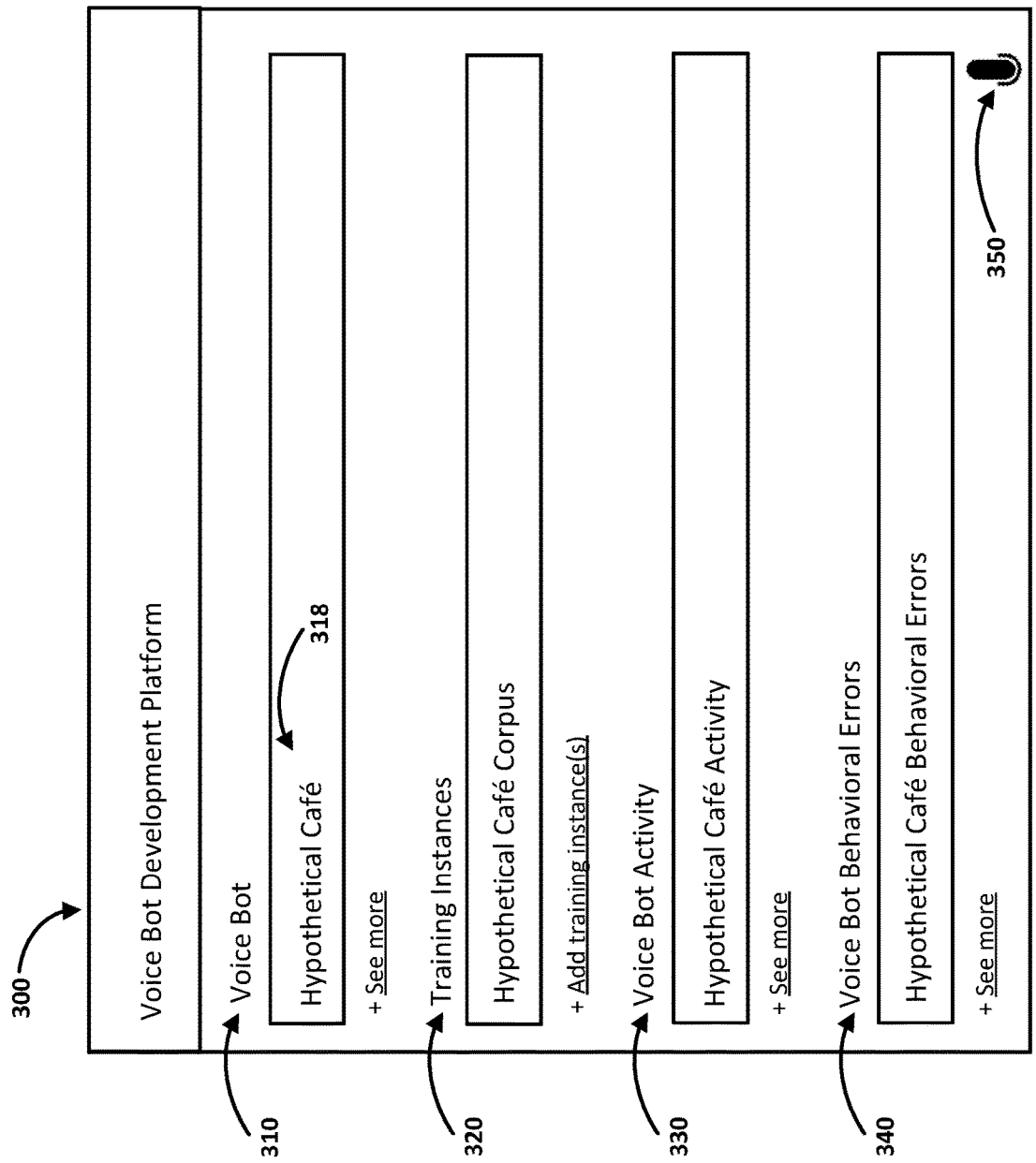
FIGS. 3A, 3B, 3C, 3D, and 3E depict various non-limiting examples of a user interface associated with a voice bot development platform, in accordance with various implementations.

Referring specifically to FIG. 3A, a home screen or landing page for the voice bot development platform is depicted as being visually rendered on the user interface 300. In various implementations, the third-party developer may be presented with various graphical elements on the home screen or landing page. For example, the user interface 300 may include a voice bot graphical element 310 that provides a snippet of any unique identifiers associated with voice bots developed by the third-party developer and/or any voice bots that are associated with the third-party (e.g., Hypothetical Café). In creating a new voice bot, the third party developer can provide a unique identifier in a text entry field 318 to be associated with the new voice bot being developed. For example, as shown in FIG. 3A, the third-party developer may provide typed input of "Hypothetical Café" in the text entry field 318, or spoken input that captures audio data corresponding to "Hypothetical Café" (and optionally in response to a user selection of the microphone interface element 350). In some implementations, the third-party developer may select a "see more" graphical element as shown in FIG. 3A to expand the snippet of voice bots (if any others exist) to include additional voice bots or launch a voice bot interface on the user interface 300.

Further, the user interface 300 may additionally or alternatively include a training instances graphical element 320 that provides a snippet of a plurality of training instances utilized in creating the new voice bot. Each of the plurality of training instances can include training instance input and training instance output. The training instance input can include, for example, at least a portion of a corresponding conversation and a prior context of the corresponding conversation, and the training instance output can include, for example, a corresponding ground truth response to at least the portion of the corresponding conversation. The plurality of training instances can be obtained, for example, from an existing corpus of telephone calls associated with Hypothetical Café (or another restaurant entity), from a demonstrative conversation between one or more humans (e.g., that may or may not include the developer), and/or from one or more other spoken utterances of one or more humans (e.g., that may or may not include the developer) that correspond to a snippet of conversation (e.g., collectively referred to as "Hypothetical Café Corpus in FIG. 3A"). Obtaining the plurality of training instances and training the voice bot associated with Hypothetical Café is described below (e.g., with respect to FIG. 3B). In some implementations, the third-party developer may select an "add training instance(s)" graphical element as shown in FIG. 3A to add training instances for training the voice bot associated with Hypothetical Café or launch a training instances interface on the user interface 300.

Moreover, the user interface 300 may additionally or alternatively include a voice bot activity graphical element 330 that provides a snippet of voice bot activity associated with the trained voice bot (e.g., referred to as "Hypothetical Café Activity" in FIG. 3A). The voice bot activity can include information related to each corresponding telephone call conducted by the trained voice bot on behalf of Hypothetical Café. For example, the voice bot activity can include a time and/or date associated with each corresponding telephone call, a duration of each corresponding telephone call, a summary associated with each corresponding telephone call, a transcript associated with each corresponding telephone call, and/or any other information related to each corresponding telephone call conducted by the trained voice bot on behalf of Hypothetical Café. In some implementations, the voice bot activity can be generated during the corresponding telephone calls and/or subsequent to each of the corresponding telephone calls. The voice bot activity enables the third-party developer to monitor performance of the voice bot. The voice bot activity is described below (e.g., with respect to FIG. 3C). In some implementations, the third-party developer may select a "see more" graphical element as shown in FIG. 3A to expand the snippet of voice bot activity (if any exists) to include additional voice activity or launch a voice bot activity interface on the user interface 300.

Even further, the user interface 300 may additionally or alternatively include a voice bot behavioral errors graphical element 330 that provides a snippet of identified voice bot behavioral errors associated with the trained voice bot (e.g., referred to as "Hypothetical Café Behavioral Errors" in FIG. 3A). The voice bot behavioral errors can include errors made by the trained voice bot during corresponding telephone calls on behalf of Hypothetical Café. These voice bot behavioral errors can include, for example, accepting or suggesting an unavailable time for a restaurant reservation, providing incorrect hours of operation, accepting orders for food that is not available, failing to solicit a value for a parameter of a task being performed during the corresponding conversations, and/or any other errors that correspond to an incorrect behavior of the trained voice bot. The voice bot behavioral errors enables the voice bot development platform to identify corresponding root causes of these voice bot behavioral errors. In some implementations, the voice bot development platform may undertake one or more actions to automatically correct the corresponding root causes, such as relabeling one or more of the plurality training instances used to re-train the voice bot, adding one or more feature emphasis inputs to one or more of the plurality training instances used to re-train the voice bot, and/or any other action that may be undertaken by the voice bot training platform to correct the corresponding root causes of the identified voice bot behavioral errors. In additional or alternative implementations, the voice bot development platform may generate one or more notifications to notify the third-party developer of the root causes of the identified voice bot behavioral errors. These notification can optionally include an indication of one or more actions that, when performed by the third-party developer, may correct of the corresponding root causes of the identified voice bot behavioral errors, such as requesting the third-party developer relabel one or more of the plurality training instances used to re-train the voice bot, requesting the third-party developer add one or more feature emphasis inputs to one or more of the plurality training instances used to re-train the voice bot, requesting the third-party developer add one or more additional training instances used to re-train the voice bot (and optionally with one or more particular labels or particular feature emphasis input), and/or any other action that may be undertaken by the third-party developer to correct the corresponding root causes of the identified voice bot behavioral errors. In some implementations, the third-party developer may select a "see more" graphical element as shown in FIG. 3A to expand the snippet of identified voice bot behavioral errors (if any exists) or launch a voice bot behavioral errors interface on the user interface 300.

Figure 3B:
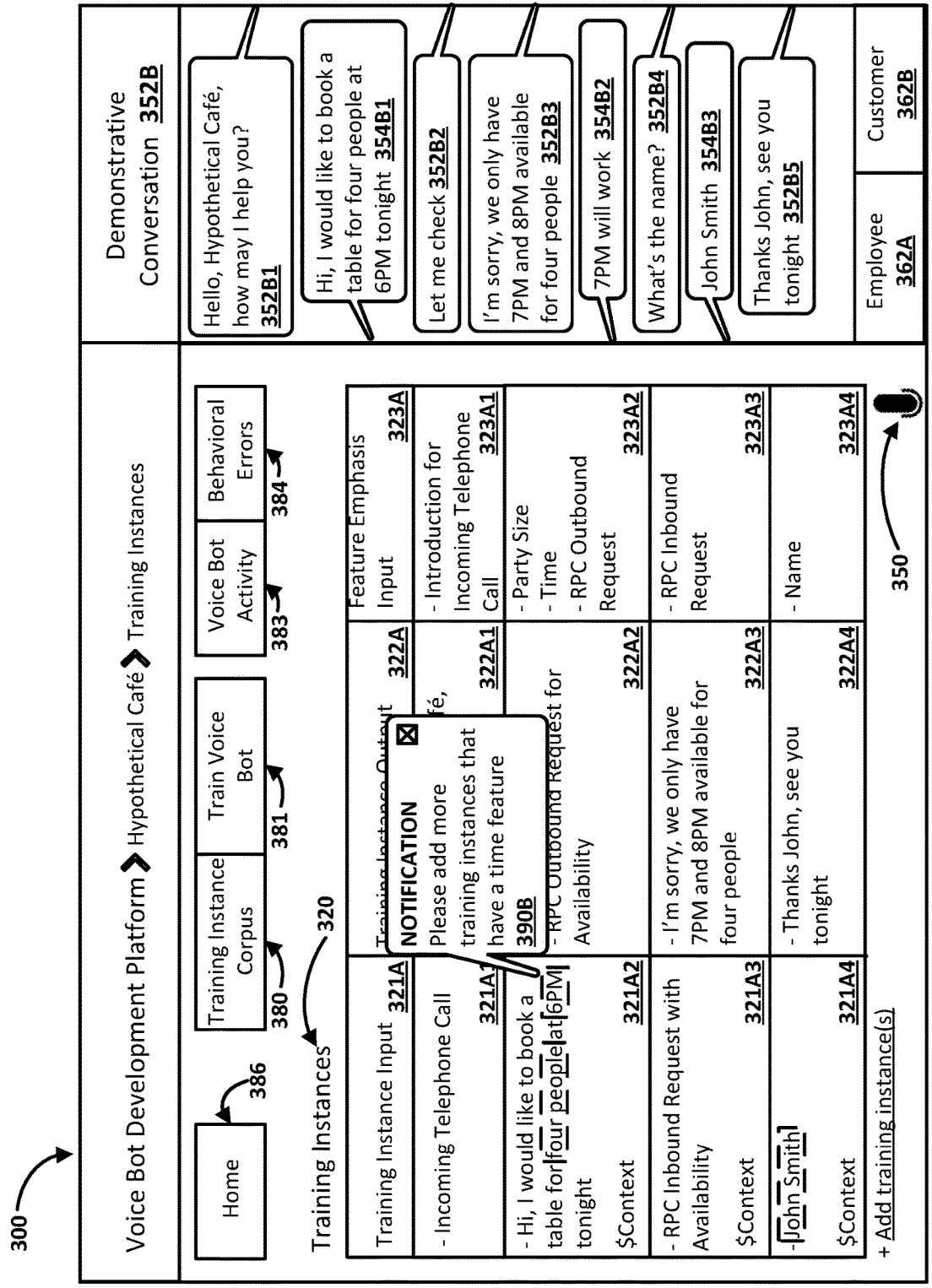

The third-party developer can navigate the home page or landing page for the voice bot shown in FIG. 3A to create a new voice bot, train the voice bot, monitor performance of the voice bot, and/or subsequently update the voice bot. For example, assume the third-party developer provides the unique identifier of "Hypothetical Café" for the voice bot in the text entry field 318, and selects the navigates to the user interface 300 to a training instances interface as shown in FIG. 3B. The third-party developer may interact with the training instances interface to define training instances for training the voice bot.

In some implementations, the training instances can be obtained from a corpus of training instances. The corpus of training instances can include, for example, one or more previous conversations between a user associated with Hypothetical Café (e.g., an employee) and an additional user (e.g., a customer) during corresponding previous telephone calls, one or more previous conversation between other users not associated with Hypothetical Café during corresponding previous telephone calls (e.g., telephone calls associated with another restaurant entity), and/or other conversations on which the training instances can be generated. For example, in response to receiving user input directed to a training instance corpus interface element 380, the third-party developer can access the corpus of training instances to select a portion of a corresponding conversation to utilize as training instance input 321A (and any prior context of the corresponding conversation) for a given training instance, and a corresponding response to the portion of the corresponding conversation to utilize as training instance output 322A for the given training instance. The user input directed to a training instance corpus interface element 380 can be, for example, touch input detected via a touchscreen or via a user interface input device (e.g., a mouse or stylus) and/or spoken input detected via microphone(s) of the client device (and optionally in response to user input directed to voice interface element 350). In various implementations, the third-party developer can optionally define a feature emphasis input 323A for the given training instance.

In some additional or alternative implementations, the training instances can be obtained from a user input received at the training instances interface presented to the user via the user interface 300. The user input received at the training instances interface can be, for example, touch or typed input detected via a touchscreen or via a user interface input device (e.g., a mouse, a stylus, a keyboard, etc.) and/or spoken input detected via microphone(s) of the client device (and optionally in response to user input directed to voice interface element 350). For example, the user can provide user input including one or more of the training instance input 321A and the training instance output 322A (and optionally the feature emphasis input 323A) in the table of training instances shown in FIG. 3B.

In some additional or alternative implementations, the training instances can be obtained from a demonstrative conversation 352B. The demonstrative conversation 352B may then be utilized to generate a plurality of training instances for training the voice bot associated with Hypothetical Café. For example, as shown by the demonstrative conversation in FIG. 3B, the third-party developer (and optionally another human) can act according to different roles to simulate an actual conversation between a human associated with Hypothetical Café (e.g., an employee) and another human (e.g., a customer) by providing user input for the demonstrative conversation (e.g., typed input or spoken input). For instance, the third-party developer can select an employee graphical element 362A and provide user input 352B1 of "Hello, Hypothetical Café, how may I help you?", select a customer graphical element 362B and provide user input 354B1 of "Hi, I would like to book a table for four people at 6 PM tonight", select the employee graphical element 362A and provide user input 352B2 of "Let me check" followed by user input 352B3 of "I'm sorry, we only have 7 PM and 8 PM available for four people", select the customer graphical element 362B and provide user input 354B2 of "7 PM will work", select the employee graphical element 362A and provide user input 352B4 of "What's the name?", select the customer graphical element 362B and provide user input 354B3 of "John Smith", and select the employee graphical element 362A and provide user input 352B5 of "Thanks John, see you tonight". The voice bot development platform can automatically generate a plurality of training instances based on the demonstrative conversation 352B. However, the third-party developer may need to specify any feature emphasis input for the training instances generated based on the demonstrative conversation 352B.

For example, assume training instance input 321A1 generated based on the demonstrative conversation 352B includes an indication that there is an incoming telephone call, and assume training instance output 322A1 includes a corresponding response to the incoming call, such as answering the incoming telephone call and providing output corresponding to the user input 352B1. In this example, features emphasis input 323A1 may correspond to an introduction feature for an incoming telephone call. The introduction for the incoming telephone call may be the user input 352B1, options presented via an interactive voice response (IVR) system, and/or other introductions that the third-party developer may want the voice bot to learn. Notably, there is no prior conversation context for the training instance input 321A1 since there are no preceding portions of the demonstrative conversation 352B. As a result, the voice bot trained on this training instance can learn how to answer incoming telephone calls. In implementations where the training instance input and/or the training instance output is based on user input, the user input may correspond to audio data that captures the user input, a plurality of speech hypotheses generated based on processing the audio data, and/or text corresponding to the user input.

As another example, assume training instance input 321A2 generated based on the demonstrative conversation 352B includes a portion of the demonstrative conversation 352B corresponding to the user input 354B1 and a prior conversation context as indicated by "$Context" (e.g., the user inputs in the demonstrative conversation 352B that occur before the user input 354B1 and/or metadata associated with the demonstrative conversation 352B), and assume training instance output 322A1 includes a corresponding response to the user input 354B1, such as the user input 352B2 and an indication to initiate a remote procedure call (RPC) outbound request for availability. In this example, features emphasis input 323A2 may correspond to features of the user input 354B1, such as a party size feature (e.g., "four people" as indicated by the dashed box for the training instance input 321A2), a time feature (e.g., "6 PM" as also indicated by the dashed box for the training instance input 321A2), and an RPC outbound request feature. Notably, the training instance output 322A2 also includes the indication to initiate the RPC outbound request for availability. This training instance may be considered an RPC training instance, and a type of the RPC training instance may be an RPC outbound request training instance.

The RPC outbound request for availability can include, for example, generating a structured request to inquire about restaurant reservation availability for a particular party size at a requested time (e.g., availability: [party size]=4; [time]=6 PM, or any other form for a structured request), and transmitting the structured request to a third-party system associated with managing restaurant reservations for Hypothetical Café. Although the RPC outbound request is not explicitly included in the demonstrative conversation 352B, the third-party developer can add or inject the RPC outbound request for availability into the training instance output 322A2. Further, although the RPC outbound request is transmitted to the third-party system (and not to the "customer" in the demonstrative conversation 352B), the voice bot can still be trained to generate and transmit the RPC outbound request for availability during the demonstrative conversation 352B based on the training instance input 321A2 requesting availability for restaurant reservations being an RPC outbound request training instance. Moreover, although the RPC outbound request is described as being associated with restaurant reservation availability, it should be understood that is for the sake of example, and is not meant to be limiting. For instance, the RPC outbound request may be associated with food/inventory availability, operating hour inquiries, transferring the telephone call, and/or any other functions that require interacting with one or more third-party systems during telephone calls. As a result, the voice bot trained on this RPC outbound request training instance can learn when and how to initiate RPC outbound requests.

Moreover, when the training instance having training instance input 321A2 and training instance output 322A2 is obtained, the voice bot development platform may generate a notification 390B that requests the third-party developer "add more training instances that have a time feature" as shown in FIG. 3B. Although the notification 390B is depicted in FIG. 3B as requesting the third-party developer to add training instances that have a time feature, it should be understood that is for the sake of example. For instance, the voice bot development platform ay request the third-party developer add training instances of a particular type (e.g., RPC training instances) and/or training instances that include particular features (e.g., a time feature, a party size feature, a name feature, and/or any other feature). In some implementations, the voice bot development platform may generate notifications that request the third-party developer add training instances of a particular type and/or training instances that include particular features until a threshold quantity of those training instances is obtained and/or performance of the voice bot with respect to handling a particular conversation associated with those training instances has been validated.

As yet another example, assume training instance input 321A3 generated based on the demonstrative conversation 352B includes a portion of the demonstrative conversation 352B corresponding to an RPC inbound request and a prior conversation context as indicated by "$Context" (e.g., the user inputs in the demonstrative conversation 352B that occur before the RPC inbound request and/or metadata associated with the demonstrative conversation 352B), and assume training instance output 322A3 includes a corresponding response to the RPC inbound request, such as the user input 352B3. In this example, features emphasis input 323A3 may correspond to an RPC inbound request feature. Notably, the training instance output 322A2 also includes the indication to initiate the RPC outbound request for availability. This training instance may be considered an RPC training instance, and a type of the RPC training instance may be RPC inbound request training instance.

The RPC inbound request with availability can include, for example, receiving a structured response that includes an indication of whether there are any restaurant reservations that satisfy parameters of the reservation request (e.g., party size of 4, and time of 6 PM), and optionally alternative one or more alternative times or ranges of time that satisfy the parameters of the reservation request. In some implementations, one or more affinity features can be generated based on a current state of the demonstrative conversation 352B. For instance, assume a requested time for a restaurant reservation is 6 PM as included in the demonstrative conversation 352B, and the requested time is available. In this instance, one or more affinity features that indicate the requested time is available can be generated. In contrast, assume the requested time for the restaurant reservation is not available. In this instance, one or more affinity features that indicate the requested time is not available and also relate the requested time to alternate times (e.g., an hour after the requested time and two hours after the requested time if the availability corresponds to 7 PM and 8 PM instead of the requested time of 6 PM).

Similar to the RPC outbound request described above, although the RPC inbound request is not explicitly included in the demonstrative conversation 352B, the third-party developer can add or inject the RPC inbound request with availability into the training instance input 321A3. Further, although the RPC inbound request is received from the third-party system (and not the "customer" in the demonstrative conversation 352B), the voice bot can still be trained to receive the RPC inbound request with availability during the demonstrative conversation 352B based on the training instance input 321A3 including availability for restaurant reservations being an RPC inbound request training instance. Moreover, although the RPC inbound request is described as being associated with restaurant reservation availability, it should be understood that is for the sake of example, and is not meant to be limiting. For instance, the RPC inbound request may be based on the corresponding RPC outbound request that was transmitted to one or more of the third-party systems. As a result, the voice bot trained on this RPC inbound request training instance can learn how to process RPC inbound requests, and how to respond based on the context of the conversation and data included in the RPC inbound request.

By training the voice bot based on RPC training instances described herein, various technical advantages can be achieved. As one non-limiting example, the voice bot can learn how and/or when to transmit requests to third-party systems and how to utilize responses to those requests in resolving the task(s) of a telephone conversation being conducted by the voice bot. As a result, the task(s) can be resolved by the voice bot during the conversation, and can be resolved efficiently and without the need to engage additional human(s) in the conversation. Further, utilization of RPC training instances enables a quantity of RPC requests to be reduced since there are less errant RPC requests, thereby conserving computational resources that would otherwise be consumed in generating the RPC requests and/or network resources that would otherwise be consumed in transmitting the RPC requests over one or more networks.

As yet another example, assume training instance input 321A4 generated based on the demonstrative conversation 352B includes a portion of the demonstrative conversation 352B corresponding to the user input 354B3 and a prior conversation context as indicated by "$Context" (e.g., the user inputs in the demonstrative conversation 352B that occur before the user input 354B3 and/or metadata associated with the demonstrative conversation 352B), and assume training instance output 322A4 includes a corresponding response to the incoming call, such as a response corresponding to the user input 352B5. In this example, features emphasis input 323A4 may correspond to a name feature (e.g., "John Smith" as indicated by the dashed box for the training instance input 321A4). Notably, in the demonstrative conversation 352B, the "customer" does not provide a name for the restaurant reservation until prompted to do so by the "employee". As a result, the voice bot trained on this training instance can learn what that a value for a name parameter should be solicited in making the restaurant reservation if the "customer" does not provide the value for the name parameter (e.g., John Smith).

In various implementations, and subsequent to defining the training instances, the voice bot associated with Hypothetical Café can be trained. For example, in response to receiving user input directed to a train voice bot graphical element 381, the voice bot can be trained based on the training instances. The voice bot associated with Hypothetical Café may correspond to one or more processors that utilize a plurality of layers of one or more ML models (e.g., RNN model(s), transformer model(s), LSTM model(s), and/or other ML models). Notably, in training the voice bot, one or more of the plurality of layers of the ML model can be attentioned to the corresponding feature emphasis inputs associated with one or more of the plurality of training instances. For example, the voice bot can be attentioned to at least a party size feature, a time feature, a name feature, an RPC outbound request feature, an RPC inbound request feature, and/or other features defined by corresponding feature emphasis inputs of various training instances.

Figure 3C:
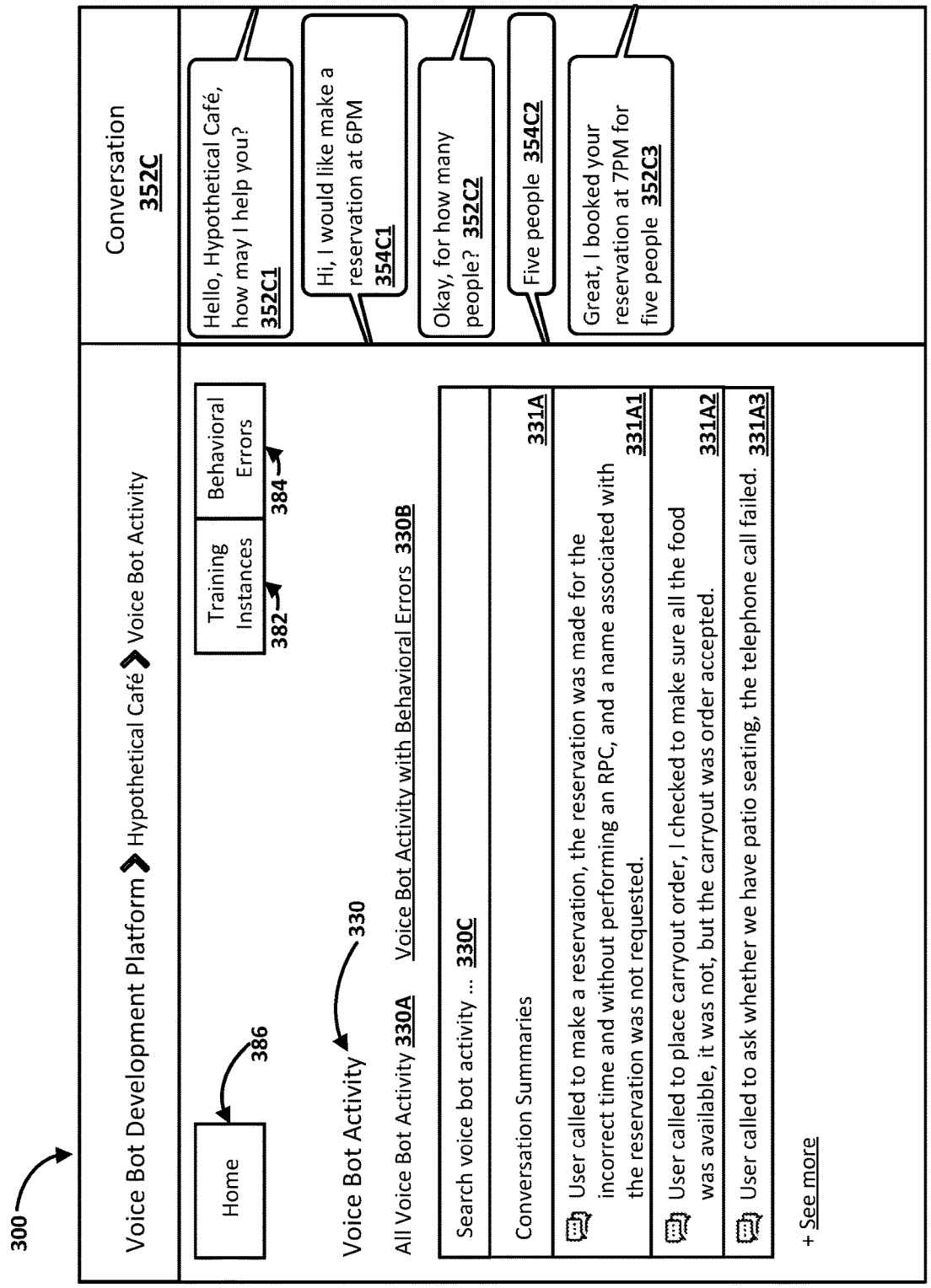

In various implementations, and subsequent to deploying the voice bot, the third-party developer can monitor performance of the voice bot in conducting conversations on behalf of Hypothetical Café. For example, in response to receiving user input directed to a voice bot activity interface element 383, the user interface 300 may present a voice bot activity interface as shown in FIG. 3C. Additionally or alternatively, in response to receiving user input directed to a home interface element 386, the user interface 300 may return to the home page or landing page as shown in FIG. 3A, and the user interface 300 may present a voice bot activity interface as shown in FIG. 3C in response to a selection, from the third-party developer, of the voice bot activity graphical element 330 (or the corresponding "see more" graphical element described above with respect to FIG. 3A). The third-party developer may interact with the voice bot activity interface to view voice bot activity for the voice bot associated with Hypothetical Café. The voice bot activity can be stored in one or more databases accessible by the client device (e.g., the voice activity database 170A2 of FIG. 1).

For example, the user can view conversation summaries 331A for telephone calls conducted by the trained voice bot and on behalf of Hypothetical Café. In some implementations, the third-party developer can view all voice bot activity of the voice bot as indicated by 330A. In some additional or alternative implementations, the third-party developer can toggle between viewing of all the voice bot activity and only voice bot activity that includes identified behavioral errors of the voice bot as indicated by 330B and as shown in FIG. 3C. The text associated with 330A and 330B may be selectable, and enable the third-party developer to toggle between these different views of the voice bot activity. In various implementations, the third-party developer can search the voice bot activity log. For example, the third-party developer may enter one or more terms into the text entry field 330C to search the voice bot activity. Moreover, in various implementations, one or more sorting criteria may be utilized to sort the conversation summaries 331A presented to the user. The one or more sorting criteria can include, for example, recency of the corresponding conversations, recency since a corresponding conversation summary was reviewed by the third-party developers, and/or any other sorting criteria.

In some implementations, the conversation summaries provide a natural language explanation of a corresponding telephone call conducted by the voice bot on behalf of Hypothetical Café. For example, conversation summary 331A1 indicates that a "User called to make a reservation, the reservation was made for the incorrect time and without performing an RPC, and a name associated with the reservation was not requested". In this example, the conversation summary 331A1 indicates the telephone call is similar to the demonstrative conversation 352B of FIG. 3B. The conversation summary 331A1 can additionally or alternatively include an indication that an RPC was performed to check the availability of the requested time and to identify the alternate time and/or other information associated with the corresponding telephone call, such as a time and a date the corresponding telephone call was conducted, a duration of time for the corresponding telephone call, pecuniary information associated with the corresponding telephone call (e.g., a cost of a carryout order), reservation information associated with the corresponding telephone call, and/or any other information derived from the corresponding telephone call.

In some additional or alternative implementations, a transcript associated with the corresponding telephone call conducted by the voice bot on behalf of Hypothetical Café can be accessed from the voice call activity interface (and optionally only if a human conversing with the voice bot consents to the monitoring of the voice bot activity for the corresponding telephone call). For example, conversation 352C portion of the voice bot activity graphical user interface includes a transcript of the conversation 352C for which the conversation summary 331A1 is generated. For instance, assume the voice bot answers an incoming telephone call directed to Hypothetical Café and that it was initiated by a human via a respective client device. Further assume the voice bot, upon answering the incoming telephone call, renders synthesized speech audio data that captures synthesized speech 352C1 of "Hello, Hypothetical Café, how may I help you?" Further assume, the voice bot processes audio data capturing a spoken utterance 354C1 of "Hi, I would like to make a reservation at 6 PM" (and the prior context of the conversation 352C), and generates synthesized speech audio data that captures synthesized speech 352C2 of "Okay, for how many people?" as a response to the spoken utterance 352C2, the human provides spoken utterance 354C2 of "five people", and the voice bot provides response 352C3 of "great, I booked your reservation at 7 PM for five people".

Notably, and in contrast with the demonstrative conversation 352B of FIG. 3B, the voice bot failed to perform an RPC to determine whether "6 PM" was available for the reservation, the voice booked the reservation for "7 PM" instead of "6 PM" without confirming the time for the reservation, and the voice bot failed to request a name for the reservation. Conversation summaries 331A2 and 331A3 provide other corresponding natural language summaries that indicate other behavioral errors of the voice bot. For instance, conversation summary 331A2 provides that a carryout order was placed even though the food was not available, and conversation summary 331A3 provides that the voice bot did not know how to handle a human asking about whether Hypothetical Café offers patio seating.

Figure 3D:
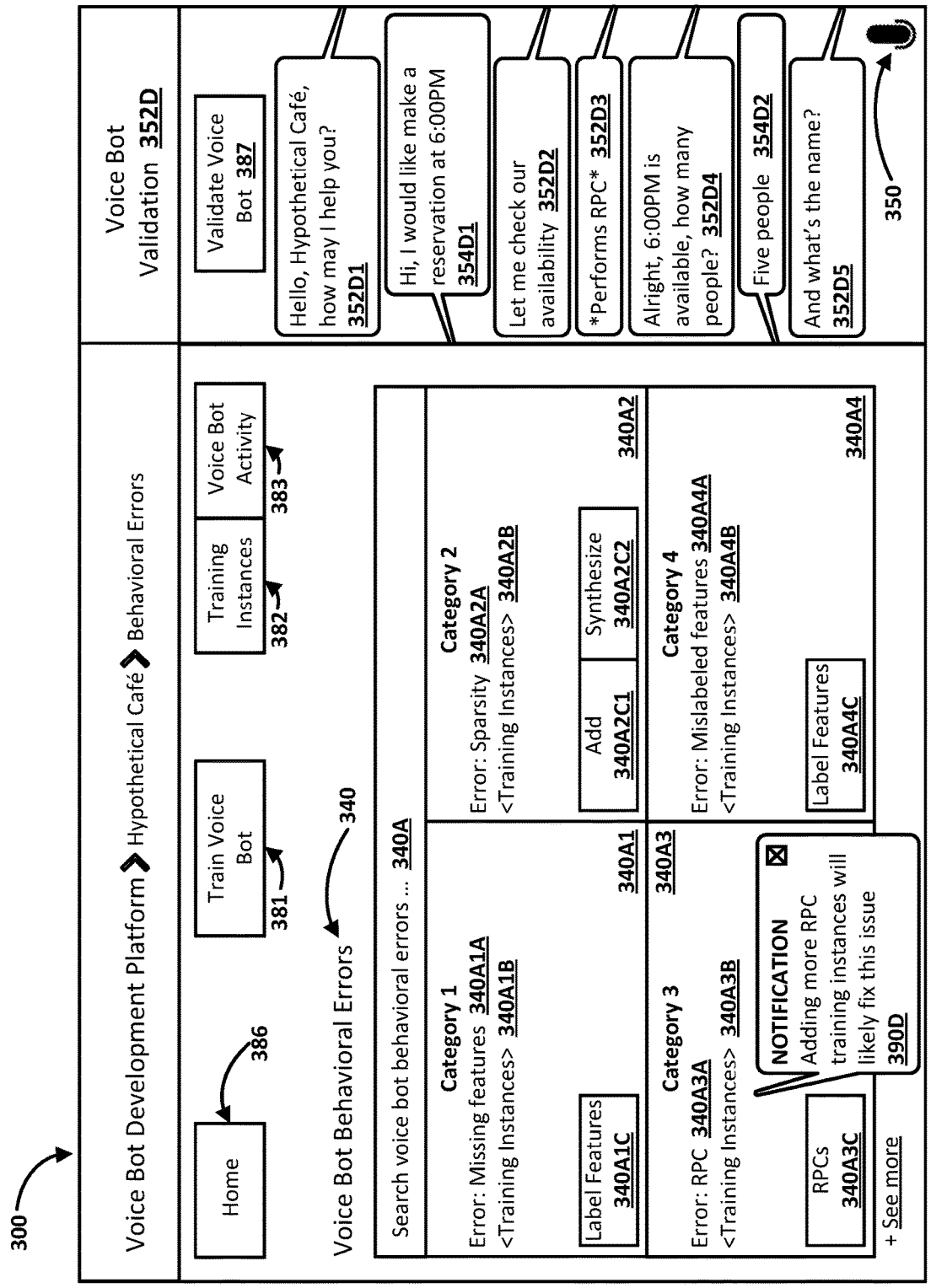
Figure 3E:
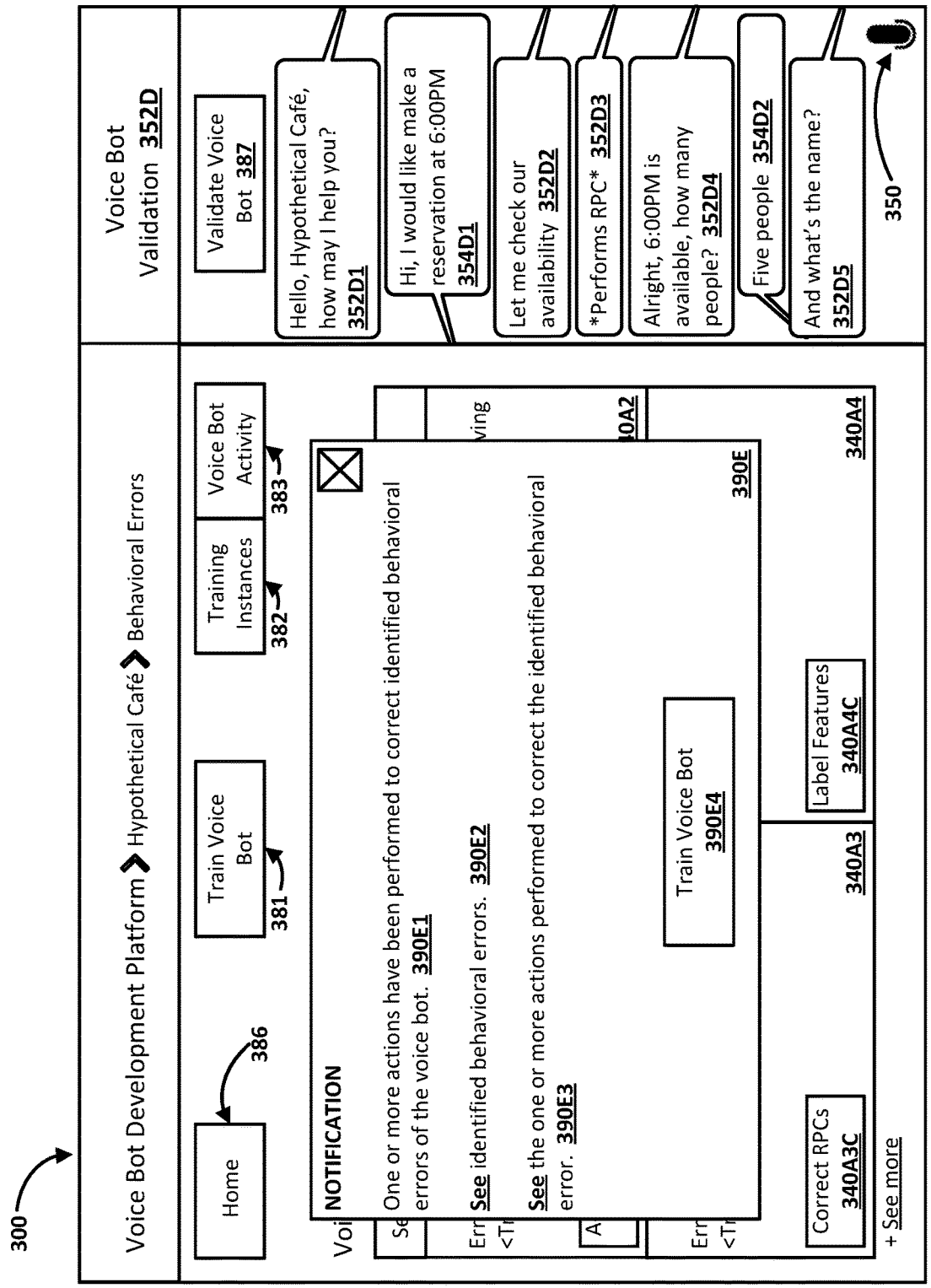

In various implementations, and subsequent to deploying the voice bot, the third-party developer can correct behavioral errors of the voice bot. For example, in response to receiving user input directed to a behavioral errors interface element 384, the user interface 300 may present a voice bot behavioral errors interface as shown in FIGS. 3D and 3E. Additionally or alternatively, in response to receiving user input directed to a home interface element 386, the user interface 300 may return to the home page or landing page as shown in FIG. 3A, and the user interface 300 may present a voice bot behavioral errors interface as shown in FIGS. 3D and 3E in response to a selection, from the third-party developer, of the voice bot behavioral errors graphical element 340 (or the corresponding "see more" graphical element described above with respect to FIG. 3A). The third-party developer may interact with the voice bot behavioral errors interface to view identified voice bot behavioral errors, view one or more actions performed by the voice bot development platform to correct the identified voice bot behavioral errors, to perform one or more actions to correct the identified voice bot behavioral errors, update the voice bot, and/or validate the voice bot.

In some implementations, the voice bot activity for Hypothetical Café (e.g., described above with respect to FIG. 3C) can be processed, using a plurality of ML layers of a ML model, to identify one or more of the behavioral errors. Further, the one or more behavioral errors can be processed, using the plurality of ML layers of the ML model or an additional plurality of ML layers of the ML model or an additional ML model, one or more behavioral error to classify the given behavioral error into one or more disparate categories of behavioral errors that may or may not be mutually exclusive. In some further versions of those implementations, the voice bot development platform can obtain corresponding embeddings generated during corresponding conversations based on at least one or more of the portions of the corresponding conversations and corresponding prior contexts of the corresponding conversations.

Further, the voice bot development platform can identify, based on the corresponding embeddings that were generated during the corresponding conversations, one or more of the training instances, included in the corpus of training instances utilized to train the voice bot. For example, the voice bot development platform can compare, in embedding space, respective embeddings generated during training of the voice bot associated with Hypothetical Café and based on one or more training instances utilized to train the voice bot associated with Hypothetical Café, and the corresponding embeddings that were generated during the corresponding conversations. Further, the voice bot development platform can identify one or more of the training instances that are associated with respective embeddings associated with corresponding distance metrics (e.g., cosine similarity distances, Euclidean distances, and/or other distance metrics) that satisfy a threshold distance. For instance, if the respective embeddings associated with one or more training instances are within a threshold distance to the corresponding embedding generated during the corresponding conversation for which the behavioral error was identified, training the voice bot based on one or more aspects of those training instances may have caused the behavioral error of the voice bot. Accordingly, those training instances may be identified as being associated with the behavioral error.

For example, and with respect to the conversation 352C and the conversation summary 331A1 of FIG. 3C, the voice bot development platform can process the spoken utterance 354C2 and/or the response 354C3 (and the preceding conversation context) to identify an RPC error. In other words, the voice bot development system can determine that the voice bot associated with Hypothetical Café should have generated an RPC outbound request to a third party reservation system in response to receiving the spoken utterance 354C2 (e.g., availability: [party size]=5; [time]=6 PM, or any other form for a structured request), and that the response 352C3 should have been based on an RPC inbound request generated by the third-party reservation system (e.g., an indication of whether the requested time is available and optionally an indication of other alternative reservation times). Accordingly, this behavioral error can be classified into category 3 340A3 associated with behavioral errors caused by RPCs as indicated by 340A3A. Further, category 3 340A3 may also include an indication of one or more training instances that are identified as potentially being a cause of the behavioral error as indicated by 340A3B. For instance, the one or more training instances as indicated by 340A3B may include RPC training instances associated with RPC requests to an incorrect third-party system, RPC training instances that are not labeled with corresponding features emphasis inputs and/or mislabeled with incorrect features emphasis inputs. Also, for instance, and as indicated by notification 390D, the voice bot development platform may provide further information to correct the behavioral errors caused by RPCs (e.g., "adding more RPC training instances will likely fix this issue"). Thus, the third-party developer can select RPCs graphical element 340A3C to correct existing RPC training instances and/or add additional RPC training instances and/or training instances graphical element 382 to return to the voice bot training instances shown in FIG. 3B. Notably, this error may also be classified into one or more of the other disparate categories.

Additionally or alternatively, and with respect to the conversation 352C and the conversation summary 331A1 of FIG. 3C, the voice bot development platform can process the spoken utterance 354C2 and/or the response 354C3 (and the preceding conversation context) to identify a missing feature error and/or a mislabeled feature error. In other words, the voice bot development system can determine that the voice bot associated with Hypothetical Café should have solicited a value for a name parameter for the reservation prior to booking the reservation, and that the response 352C3 should have actually solicited the value for the name parameter. Accordingly, this behavioral error can be classified into category 1 340A1 associated with behavioral errors caused by a missing name feature as indicated by 340A1A.

Further, category 1 340A1 may also include an indication of one or more training instances that are identified as potentially being a cause of the behavioral error as indicated by 340A1B. For instance, the one or more training instances as indicated by 340A1B may include training instances that include a name feature, but it is not labeled as a name feature or does not include a corresponding feature emphasis input indicative of a name feature. Moreover, this behavioral error can be classified into category 4 340A4 associated with behavioral errors caused by a mislabeled name feature as indicated by 340A4A. Further, category 4 340A4 may also include an indication of one or more training instances that are identified as potentially being a cause of the behavioral error as indicated by 340A4B. For instance, the one or more training instances as indicated by 340A4B may include training instances that include a name feature, but it is mislabeled as a party size feature or other feature. Thus, the third-party developer can select label features graphical element 340A1C and/or 340A4C to label or relabel one or more training instances as indicated by 340A1B and/or 340A4C, respectively, and/or training instances graphical element 382 to return to the voice bot training instances interface shown in FIG. 3B to label and/or relabel one or more of the training instances.

Moreover, in implementations where the identified behavioral error of the voice bot includes a missing feature error (e.g., classified into category 1 340A1 of FIG. 3D), the voice bot development platform can generate a notification requesting that the third-party developer add one or more missing features to one or more training instances. For example, the voice bot development platform can identify a first training instance and a second training instance, and can include the first training instance and the second training instance in the notification along with a request for the third-party developer to define one or more features of the training instances. For instance, assume the first training instance and the second training instance both include the term "six". However, further assume that the term "six" in the first training instance is referencing a party size feature for a restaurant reservation, whereas the term "six" in the second training instance is referencing a time feature for a restaurant reservation. In response to the notification being presented to the user, the third-party developer can label these missing features accordingly. As a result, the updated voice bot may subsequently be able to better distinguish between these features in view of the conversation context for the respective corresponding conversations.

Additionally or alternatively, and with respect to the conversation 352C and the conversation summary 331A1 of FIG. 3C, the voice bot development platform can process the spoken utterance 354C2 and/or the response 354C3 (and the preceding conversation context) to identify a sparsity error. In other words, the voice bot development system can determine that the voice bot associated with Hypothetical Café should have solicited a value for a name parameter for the reservation prior to booking the reservation and/or should have performed an RPC to a third-party restaurant reservation system, and that the response 352C3 should have actually solicited the value for the name parameter and/or should have been in response to an RPC request. However, the voice bot development platform may not have training instances having a name feature or a corresponding feature emphasis input indicative of a name feature and/or RPC training instances. Accordingly, this behavioral error can be classified into category 2 340A2 associated with behavioral errors caused by a sparsity of training instances having a particular feature (e.g., a name feature) and/or a sparsity of training instances of a particular type (e.g., RPC training instances) as indicated by 340A2A.

Further, category 2 340A2 may also include an indication of one or more training particular features and/or particular types of training instances that caused the sparsity error of the behavioral error as indicated by 340A2B. For instance, the one or more training instances as indicated by 340A2B may include training instances that include a name feature and a request that additional training instances having the name feature be added, a request that additional RPC training instances be added, and/or other training instances having particular features or other types of training instances. Thus, the third-party developer can select add training instances graphical element 340A2C1 to add one or more training instances 340A2B, and/or training instances graphical element 382 to return to the voice bot training instances interface shown in FIG. 3B to add additional training instances to correct the sparsity error.

In additional or alternative implementations, the voice bot development platform may automatically perform one or more actions directed to correcting any identified behavioral errors. For example, the voice bot development system can synthesize one or more training instances in response to receiving a selection of synthesize graphical element 340AC2. The one or more synthesized training instances can be generated based on corresponding conversations from the voice bot activity and/or augmenting existing training instances. For instance, the voice bot development platform can synthesize one or more of the synthesized training instances in the same or similar manner described above with respect to generating training instances based on the demonstrative conversation 352B of FIG. 3B. Further, the voice bot development platform can request that the developer provide one or more corresponding feature emphasis inputs for the one or more synthesized training instances. Also, for instance, the voice bot development platform can synthesize one or more of the synthesized training instances by modifying training instance input (e.g., modifying a portion of the corresponding conversation or the context of the conversation) and/or training instance output of a given training instance (e.g., a different response based on the modified portion of the corresponding conversation and/or the modified context of the conversation). As another example, the voice bot development platform can automatically label or relabel one or more features of one or more training instances. The one or more training instances can be labeled and/or relabeled based on NLU or other data associated with one or more of the labels being associated with one or more terms of the portion of the corresponding conversation or the ground truth response of one or more of the training instances. For instance, if a portion of the corresponding conversation includes one or more terms indicative of a time (e.g., "AM" or "PM"), then the terms indicative of the time can be labeled with a time feature.

In some versions of those implementations, and as shown in FIG. 3E, the voice bot development platform can generate a notification 390E, and cause the notification to be presented to the user when one or more actions to correct identified behavioral errors of the voice bot are identified. For instance, the notification 390E can include an indication 390E1 notifying the third-party developer that one or more actions have been performed to correct identified behavioral errors of the voice bot, such as synthesizing one or more training instances, labeling missing features of one or more training instances, and/or relabeling features of one or more training instances. Further, the notification 390E2 can additionally or alternatively include an indication 390E2 notifying the third-party developer of the identified behavioral errors that the actions were intended to correct, and additionally or alternatively include an indication 390E3 notifying the third-party developer of the one or more actions that were automatically performed by the voice bot development system. These indications 390E2 and/or 390E3 may be selectable to enable the third-party developer to view the behavioral errors and the actions that are directed to correcting the behavioral errors.

In various implementations, and subsequent to the one or more actions that are directed to correcting one or more behavioral errors of the voice bot, the voice bot can be further trained based at least in part on any added or synthesized training instances and/or any modified existing training instances. The voice bot can be further trained based at least in part on these training instances in the same or similar manner described above with respect to FIGS. 2 and 3B. Notably, in further training the voice bot, respective weights of one or more of the plurality of ML layers implemented by at least one processor corresponding to the voice bot associated with Hypothetical Café may be updated, while respective weights of one or more other layers may remain fixed. In some implementations, the voice bot may be further trained in response to a selection of one or more graphical elements (e.g., 381 and/or 390E4). In additional or alternative implementations, the voice bot may be further trained in response to determining one or more conditions are satisfied. The one or more conditions can include, for example, determining a duration of time has lapsed (e.g., every night, every week, and/or other durations of time), determining that no instances of the voice bot are being implemented, determining a quantity of changes to the corpus since last training the voice bot satisfies a quantity threshold, and/or other conditions.

In various implementations, and subsequent to further training the voice bot based at least in part on any added or synthesized training instances and/or any modified existing training instances, the voice bot may be validated. In some implementations, the voice bot can be validated based on validation training instances that were withheld from being utilized in training the voice bot. In some additional or alternative implementations, the voice bot can be validated based on user input directed to the voice bot development platform. For example, the third-party developer can direct input to graphical element 350 to initiate a validating conversation 352D. The updated voice bot can provide a response 352D1, and the conversation can continue as indicated by 354D1, 352D2, 352D3, 352D4, 354D2, and 352D5. Notably, the conversation flow on the validating conversation 352D follows the same conversation flow as the conversation 352C of FIG. 3C. However, in contrast with the conversation 352C described with respect to FIG. 3C conducted by the voice bot prior to being updated, the updated voice bot correctly performs the RPC, correctly solicits a value for a name parameter, and utilizes the correct time in making the reservation. In some implementations, the voice bot may be validated in response to a selection of one or more graphical elements (e.g., 387). In additional or alternative implementations, the voice bot may be validated in response to the voice bot being further trained. Moreover, voice bot performance metrics can be presented to the third-party developer. The voice bot performance metrics can include one or more measured improvements of the voice bot (e.g., response accuracy, response time, and/or other performance metrics).

Although FIGS. 3C, 3D, and 3E are described herein with respect to particular errors being classified into particular categories of errors, it should be understood that is for the sake of example and is not meant to be limiting. Moreover, although only a single instance of the voice bot associated with the Hypothetical Café is described with respect to FIGS. 3A, 3B, 3C, 3D, and 3E, it should be understood that is for the sake of example, and is not meant to be limiting. For example, multiple instances of the voice bot may be simultaneously implemented by one or more computing devices (e.g., client device(s), server(s), and/or other computing device(s)), such that the multiple instances of the voice bot can simultaneously be engaged in conversations with corresponding humans (or other voice bots). Each instance of the voice bot can include corresponding processor(s) utilizing a corresponding instance of the plurality of ML layers of the voice bot. Moreover, although the voice bot associated with the Hypothetical Café is described with respect to FIGS. 3A, 3B, 3C, 3D and 3E as answering incoming telephone calls, it should be understood that is for the sake of example, and is not meant to be limiting. For example, the voice can additionally or alternatively be trained to initiate outgoing telephone calls to various entities. For instance, training instance input, for a given training example, can include an action or command to initiate a corresponding telephone call with a particular entity to perform a particular task, and training instance output, for the given training instance, can include a corresponding ground truth response associated with initiating an outgoing telephone call. In this manner, the voice bot associated with the Hypothetical Café can be utilized to initiate and conduct outgoing telephone calls to order more inventory from suppliers, inquire about software issues from information technology, verify restaurant reservations with patrons, and/ or perform any other function for which the voice bot is trained.

Turning now to FIG. 4, a flowchart illustrating an example method 400 of updating a trained voice bot is depicted. For convenience, the operations of the method 400 are described with reference to a system that performs the operations. This system of the method 400 includes at least one processor, at least one memory, and/or other component(s) of computing device(s) (e.g., client device 110 of FIG. 1, voice bot development platform 120 of FIG. 1, and/or computing device 710 of FIG. 7, server(s), and/or other computing devices). Moreover, while operations of the method 400 are shown in a particular order, this is not meant to be limiting. One or more operations may be reordered, omitted, and/or added.

At block 452, the system identifies a trained voice bot that is associated with a third-party and a corpus of training instances utilized to train the trained voice bot. The system can identify the trained voice bot and the corpus of training instances utilized to train the trained voice bot based on user input directed to a voice bot development platform interface. The user input can be touch input, typed input, and/or spoke input received from a third-party developer that is associated with the third-party via a respective client device.

At block 454, the system obtains voice bot activity for the trained voice bot. The voice bot activity can include, for example, corresponding conversations conducted by the trained voice bot on behalf of the third-party, corresponding conversation summaries for one or more of the corresponding conversations, behavioral errors associated with one or more of the corresponding conversations, pecuniary information associated with the corresponding conversations, and order or purchase associated with the corresponding conversations, and/or other information derived from the corresponding conversations. The voice bot activity can be stored in one or more databases (e.g., voice bot activity database 170A2 of FIG. 1).

At block 456, the system identifies, based on processing the voice bot activity, a given behavioral error of the trained voice bot. The system can identify the given behavioral error of the trained voice bot by processing, using a plurality of ML layers of one or more ML models, the voice bot activity to identify the given behavioral error. Further the system can process, using the plurality of ML layers of the ML model or an additional plurality of ML layers of the ML model or an additional ML model, the given behavioral error to classify the given behavioral error into one or more disparate categories of behavioral errors. In particular, the system can process at least one or more corresponding portions of corresponding conversations to identify the conversations that include some misbehavior of the trained voice bot, and can further process the misbehavior to categorize it into one or more disparate categories of behavioral errors. The one or more disparate categories of behaviors errors can be associated with, for example, a missing feature error category, a mislabeled feature error category, a sparsity error category for a particular feature, a sparsity error category for a particular type of training instance, an RPC outbound request error category, an RPC inbound request error category, and/or other categories of behavioral errors of the trained voice bot.

In some implementations, block 456 may include sub-block 456A. If included, at sub-block 456A, the system identifies one or more training instances in the corpus that are associated with the given behavioral error. In implementations that include sub-block 456A, the system can obtain one or more corresponding embeddings generated during a given corresponding conversation for which a voice bot behavioral error is identified. The one or more corresponding embeddings may have been generated during the given corresponding conversation based on at least one or more of the portions of the given corresponding conversation and a corresponding prior context of the given corresponding conversation for each of the one or more portions of the given corresponding conversation. Further, the system can identify, based on the one or more corresponding embeddings, one or more of the training instances, included in the corpus of training instances utilized to train the trained voice bot, that are associated with the given behavioral error. For example, the system can obtain a respective embedding associated with one or more training of the instances generated while training the trained voice bot, compare the respective embedding associated with one or more of the training instances with the one or more corresponding embeddings generated during the conversation for which a voice bot behavioral error is identified in an embedding space, and identify one or more of the training instances that are associated with the respective embeddings that satisfy a distance criterion with respect to one or more of the corresponding embeddings. These training instances, mislabeled features thereof, missing features thereof, and/or a sparsity of these training instances may be a root cause of the given behavioral error of the trained voice bot.

At block 458, the system determines, based on the given behavioral error of the trained voice bot, an action that is directed to correcting the given behavioral error of the trained voice bot. In various implementations, the action that is directed to correcting the given behavioral error of the trained voice bot may be determined based on the one or more disparate categories of behavioral errors into which the given behavioral error of the trained voice bot is classified.

In some implementations, block 458 may include sub-block 458A. If included, at sub-block 458A, the action determined by the system may include modifying one or more training instances in the corpus utilized to train the trained voice bot. For example, in implementations where the given behavioral error is classified into a category associated with a missing feature error, the action directed to correcting the given behavioral error may be a labeling action associated with labeling missing features of one or more existing training instances. As another example, in implementations where the given behavioral error is classified into a category associated with a mislabeled feature error, the action directed to correcting the given behavioral error may be a relabeling action associated with relabeling one or more mislabeled features of one or more existing training instances.

In some additional or alternative implementations, block 458 may additionally or alternatively include sub-block 458B. If included, at sub-block 458B, the action determined by the system may include adding one or more additional training instances to the corpus utilized to train the trained voice bot. For example, in implementations where the given behavioral error is classified into a category associated with a sparsity error, the action directed to correcting the given behavioral error may be a training instance action associated with one or more additional training instances being added to the corpus of training instances. The one or more additional training instances may include a particular feature requested by the system and/or be of a particular type of training instance requested by the system. In some implementations, the one or more additional training instances may be defined by the third-party developer (e.g., as described with respect to FIG. 3B), whereas in additional or alternative implementations, the one or more additional training instances may be synthesized by the system (e.g., as described with respect to FIGS. 3D and 3E).

At block 460, the system generates, based on the action that is directed to correcting the given behavioral error of the trained voice bot, a notification to be presented to a third-party developer that is associated with the third-party. At block 462, the system causes the notification to be presented to the third-party developer. The notification can be presented to the user via a user interface associated with the voice development platform, and can be presented to the user visually and/or audibly via a client device of the third-party developer. In some implementations, the notification may include an indication of the given behavioral error of the trained voice bot, and an indication of a request for the third-party developer to perform the action that is directed to correcting the behavioral error of the voice bot. In some additional or alternative implementations, the notification may include an indication of the given behavioral error of the trained voice bot, and an indication that the system automatically performed the action that is directed to correcting the given behavioral error of the voice bot.

At block 464, the system determines whether to update the voice bot based on an updated corpus of training instances that includes at least one or more modified training instances (e.g., as described with respect to sub-block 458A) and/or one or more additional training instances (e.g., as described with respect to sub-block 458B). In some implementations, the system may determine to update the voice bot in response to receiving user input that is directed to updating the voice bot (e.g., a selection of the train voice bot selectable element 381 of FIGS. 3D and 3E). In additional or alternative implementations, the system may determine to update the voice bot in response to determining one or more conditions are satisfied. The one or more conditions can include, for example, determining a duration of time has lapsed (e.g., every night, every week, and/or other durations of time), determining that no instances of the voice bot are being implemented, determining a quantity of changes to the corpus since last training the voice bot satisfies a quantity threshold, and/or other conditions. If, at an iteration of block 464, the system determines not to update the voice bot, then the system may continue to monitor for when to update the voice bot at block 464. As the system monitors for when to update the voice bot at block 464, the system may implement one or more additional instances of the operations of blocks 452-462 to identify additional behavioral errors and determine corresponding actions directed to correcting any additional behavioral errors that are identified. If, at an iteration of block 464, the system determines to update the voice bot, then the voice bot can be updated based on the updated corpus of training instances, and the system may proceed to block 466.

At block 466, the system causes the updated voice bot to be deployed for conducting conversations on behalf of the third-party. For example, the updated voice bot can be deployed to answer incoming telephone calls and/or initiate outgoing telephone calls, on behalf of the third-party, and conduct conversations with corresponding humans during the telephone calls, interact with a human at a drive thru, serve as an automated assistant, and/or be deployed to conduct any conversations, on behalf of the third-party, for human-to-computer dialogs on behalf of the third-party. Although not depicted in FIG. 4 for the sake of brevity, it should be understood that the updated voice bot may be validated prior to being deployed for conducting the conversation on behalf of the third-party. In some implementations, the voice bot can be validated based on validation training instances that were withheld from being utilized in initially training and/or subsequently updating the voice bot. In some additional or alternative implementations, the voice bot can be validated based on user input directed to the voice bot development platform (e.g., as described with respect to FIG. 3E). In implementations where the updated voice bot is validated prior to being deployed, the updated may not be deployed unless the validation of the updated voice bot indicates there is some measured improvement of the updated voice bot as compared to the voice bot that is currently deployed for conducting conversations on behalf of the third-party.

Figure 5:
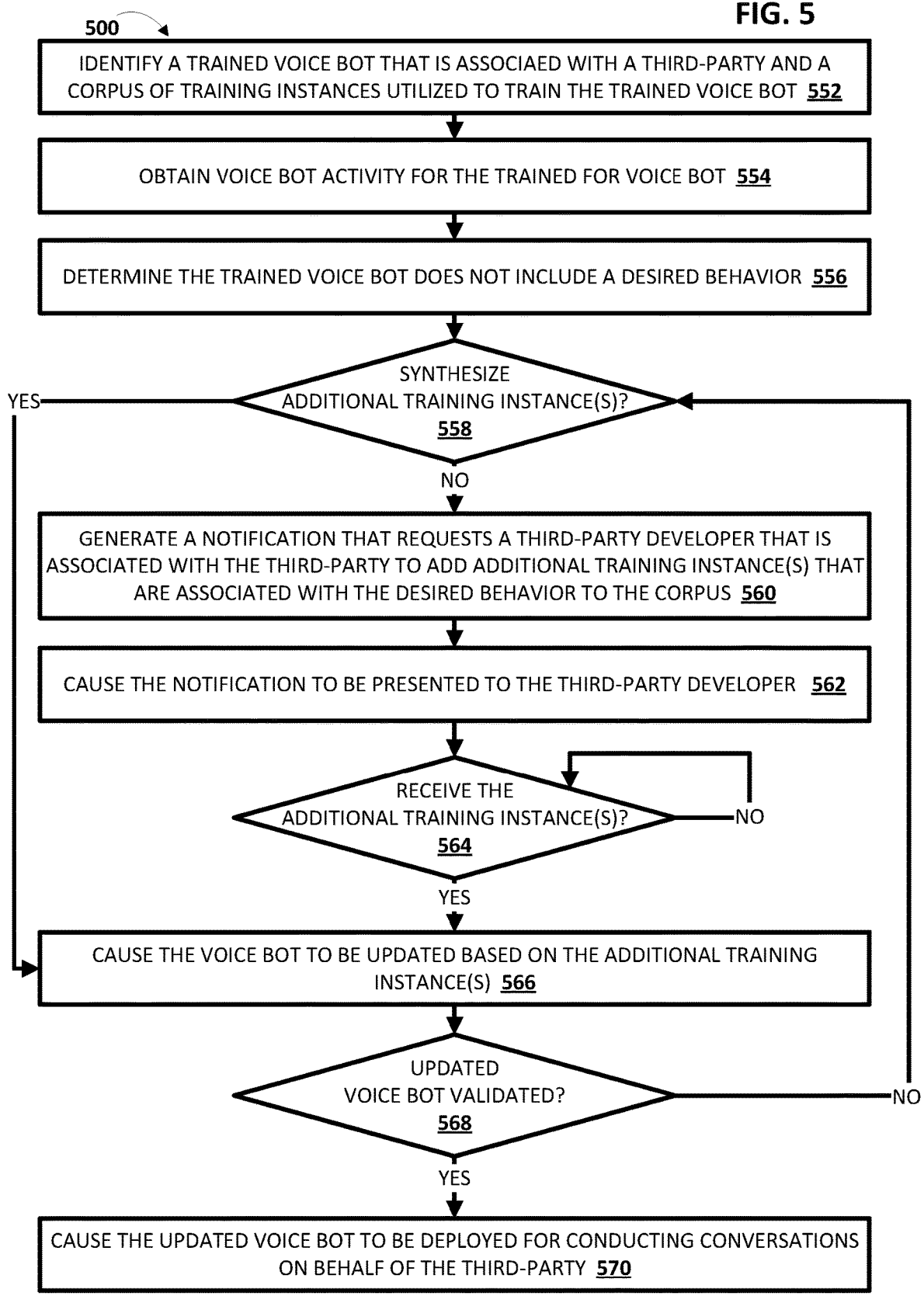
FIG. 5 depicts a flowchart illustrating an example method updating a trained voice bot based on additional training instances added to a corpus of training instances utilized to train the voice bot, in accordance with various implementations.

Turning now to FIG. 5, a flowchart illustrating an example method 500 of updating a trained voice bot based on additional training instances added to a corpus of training instances utilized to train the voice bot is depicted. For convenience, the operations of the method 500 are described with reference to a system that performs the operations. This system of the method 500 includes at least one processor, at least one memory, and/or other component(s) of computing device(s) (e.g., client device 110 of FIG. 1, voice bot development platform 120 of FIG. 1, and/or computing device 710 of FIG. 7, server(s), and/or other computing devices). Moreover, while operations of the method 500 are shown in a particular order, this is not meant to be limiting. One or more operations may be reordered, omitted, and/or added.

At block 552, the system identifies a trained voice bot that is associated with a third-party and a corpus of training instances utilized to train the trained voice bot. At block 554, the system obtains voice bot activity for the trained voice bot. The operations of block 552 and block 554 can be performed in the same or similar manner described above with respect to blocks 452 and 454, respectively.

At block 556, the system determines the trained voice bot does not include a desired behavior. The system can determine that the trained voice bot does not include the desired behavior based on processing the voice bot activity. For example, assume the trained voice bot is associated with a fictitious airline named Hypothetical Airlines, and assume the voice should be able to change existing flight reservations. However, further assume the voice bot associated with Hypothetical Airlines has never requested a frequent flier number in changing any existing flight reservations, but that the frequent flier number is a value for a parameter associated with changing existing flight reservations. In this example, requesting the frequent flier number may be the desired behavior, but the voice bot associated with Hypothetical Airline does not include this desired behavior.

Ay block 558, the system determines whether to synthesize one or more additional training instances that are associated with the desired behavior. The system can determine whether to synthesize one or more additional training instances based on whether the system is enabled, by the third-party developer, to synthesize one or more of the training instances. The one or more synthesized training instances may be associated with the desired behavior (e.g., associated with requesting frequent flier numbers, having corresponding feature emphasis inputs associated with the frequent flier number feature, receiving frequent flier number values, etc.). Further, the one or more synthesized training instances can be synthesized based on corresponding conversations from the voice bot activity and/or augmenting existing training instances (e.g., as described with respect to FIG. 3D). If, at an iteration of block 558, the system determines to synthesize one or more additional training instances that are associated with the desired behavior, the system synthesizes one or more of the additional training instances and proceeds to block 566. Block 566 is described in greater detail below. If, at an iteration of block 558, the system determines not to synthesize one or more additional training instances that are associated with the desired behavior, the system refrains from synthesizing one or more of the additional training instances and proceeds to block 560.

At block 560, the system generates a notification that requests a third-party developer that is associated with the third-party to add one or more additional training instances that are associated with the desired behavior to the corpus. At block 562, the system causes the notification to be presented to the third-party developer. The notification can be presented to the user via a user interface associated with the voice development platform, and can be presented to the user visually and/or audibly via a client device of the third-party developer. In some implementations, the notification may request a threshold quantity of training instances associated with the desired behavior, and an indication of a request for the third-party developer to perform add one or more of the training instances associated with the desired behavior. In some additional or alternative implementations, the notification may include an indication that one or more training instances associated with the desired behavior were synthesized by the system and optionally include a selectable element that, when selected, allows the third-party developer to view those training instances.

At block 564, the system determines whether any user input that includes one or more of the additional instances that are associated with the desired behavior are received from the third-party developer responsive to the notification being presented to the third-party developer. The user input may be directed to the client device associated with the third-party developer that is being utilized to update the voice bot. If, at an iteration of block 564, the system determines that no user input including one or more of the additional instances that are associated with the desired behavior is received, the system may continue monitoring for the user input at block 564. If, at an iteration of block 564, the system determines that user input including one or more of the additional instances that are associated with the desired behavior is received, the system may proceed to block 566.

At block 566, the system causes the voice bot to be updated based on one or more of the additional training instances. The voice bot can be updated based at least in part on one or more of the synthesized training instances and/or one or more of the training instances added by the third-party developer in the same or similar manner described above with respect to FIGS. 2 and 3B. Although not depicted in FIG. 5 for the sake of brevity, it should be understood that the system may determine whether to update the voice bot prior to the voice bot being updated (e.g., as described with respect to block 464 of FIG. 4).

At block 568, the system determines whether the updated voice bot is validated. In some implementations, the voice bot can be validated based on validation training instances that were withheld from being utilized in initially training and/or subsequently updating the voice bot. In some additional or alternative implementations, the voice bot can be validated based on user input directed to the voice bot development platform (e.g., as described with respect to FIG. 3E). The system may determine that the updated voice bot is validated when one or more conditions are satisfied that reflect a measured improvement of the updated voice bot as compared to the voice bot that is currently deployed for conducting conversations on behalf of the third-party. For example, the one or more conditions can include validation of one or more a plurality of ML layers or a plurality of additional ML layers that are updated in further training the voice bot, convergence of one or more of the plurality of ML layers or the plurality of additional ML layers that are updated (e.g., zero loss or within a threshold range of zero loss), determination that one or more of the plurality of ML layers or the plurality of additional ML layers performs better (e.g., with respect to precision and/or recall) than the instance of the voice bot currently being utilized (if any), occurrence of training based on at least a threshold quantity of training instances, and/or a duration of training based on the training instances. If, at an iteration of block 568, the system determines that the updated voice bot is not validated, then the system may return to block 558 and determine whether to synthesize one or more additional training instances and repeat the operations of block 558-566 to further update the trained voice bot. If, at an iteration of block 568, the system determines that the updated voice bot is validated, then the system may proceed to block 570.

At block 570, the system may cause the updated voice bot to be deployed for conducting conversations on behalf of the third-party. For example, the updated voice bot can be deployed to answer incoming telephone calls and/or initiate outgoing telephone calls, on behalf of the third-party, and conduct conversations with corresponding humans during the telephone calls, interact with a human at a drive thru, serve as an automated assistant, and/or be deployed to conduct any conversations, on behalf of the third-party, for human-to-computer dialogs on behalf of the third-party.

Figure 6:
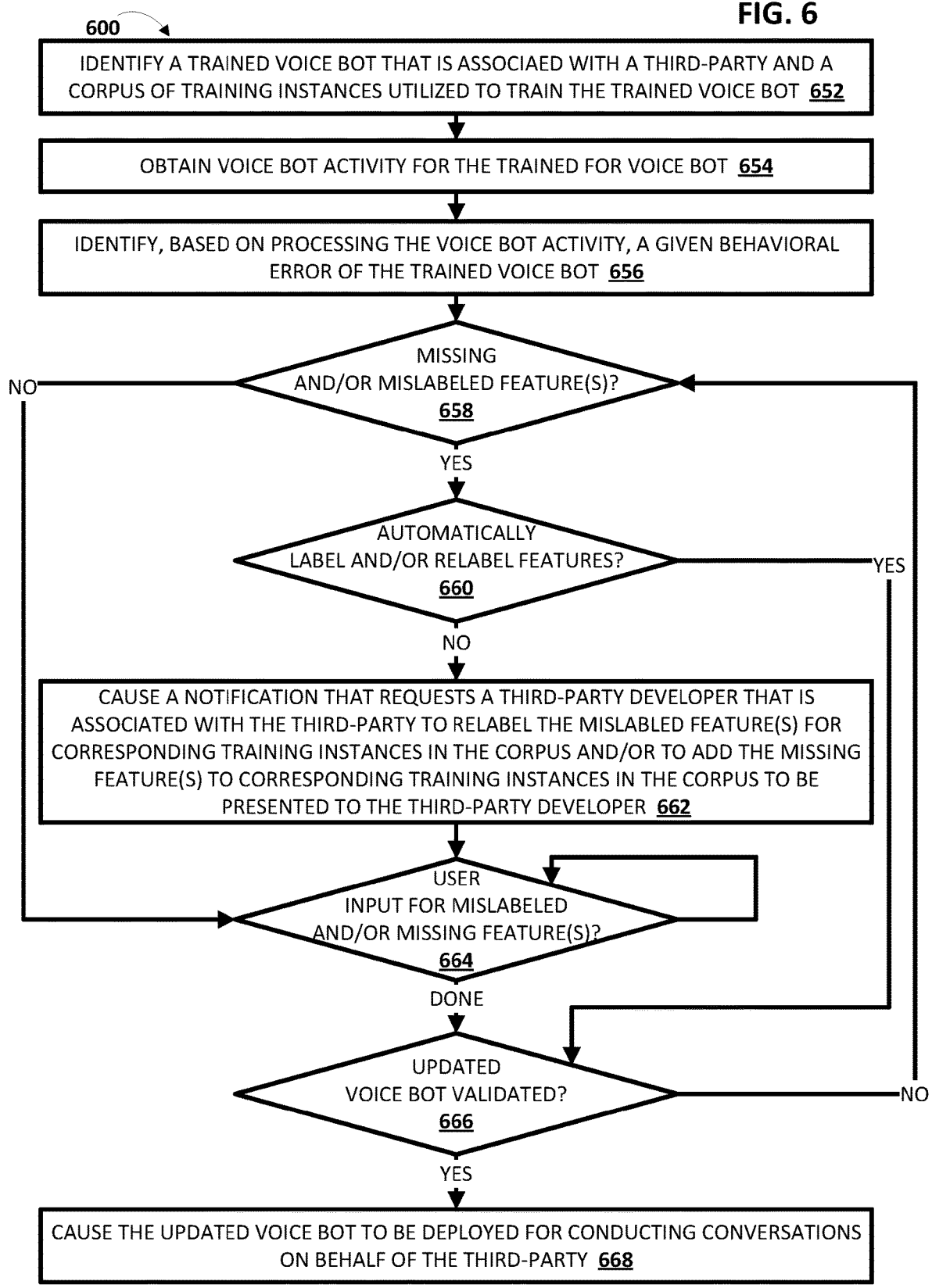
FIG. 6 depicts a flowchart illustrating an example method updating a trained voice bot based on mislabeled features and/or missing features for training included in a corpus of training instances utilized to train the voice bot, in accordance with various implementations.

Turning now to FIG. 6, a flowchart illustrating an example method 600 of updating a trained voice bot based on mislabeled features and/or missing features for training included in a corpus of training instances utilized to train the voice bot is depicted. For convenience, the operations of the method 600 are described with reference to a system that performs the operations. This system of the method 600 includes at least one processor, at least one memory, and/or other component(s) of computing device(s) (e.g., client device 110 of FIG. 1, voice bot development platform 120 of FIG. 1, and/or computing device 710 of FIG. 7, server(s), and/or other computing devices). Moreover, while operations of the method 500 are shown in a particular order, this is not meant to be limiting. One or more operations may be reordered, omitted, and/or added.

At block 652, the system identifies a trained voice bot that is associated with a third-party and a corpus of training instances utilized to train the trained voice bot. At block 654, the system obtains voice bot activity for the trained voice bot. At block 656, the system identifies, based on processing the voice bot activity, a given behavioral error of the trained voice bot. The operations of block 652, block 654, and block 656 can be performed in the same or similar manner described above with respect to blocks 452, 454, and 456, respectively.

At block 658, the system determines whether the given behavioral error is caused by one or more mislabeled features for one or more corresponding training instances in the corpus and/or one or more of the missing features for one or more corresponding training instances in the corpus. The system can analyze the given behavioral error identified at block 656 to determine whether it is associated with one or more of disparate categories of behavioral errors that are indicative of being caused by one or more training instances, included in the corpus of training instances identified at block 652, having one or more mislabeled features or one or more missing features. If, at an iteration of block 658, the system determines the given behavioral error is not caused by one or more mislabeled features and/or missing features for one or more of the corresponding training instances in the corpus, the system may proceed to block 664. Block 664 is described below. If, at an iteration of block 658, the system determines the given behavioral error is caused at least in part by one or more mislabeled and/or missing features for one or more of the corresponding training instances in the corpus, the system may proceed to block 660.

At block 660, the system determines whether one or more of the missing features can be automatically labeled and/or one or more of the mislabeled features can be automatically relabeled. The system can determine whether one or more training instances having missing features can be automatically labeled and/or mislabeled features can be relabeled based on NLU data or other data associated with one or more of the labels being associated with one or more terms included in one or more of the training instances that are identified as having one or more mislabeled features. For instance, if a portion of the corresponding conversation on which a given training instance is generated includes one or more terms indicative of a time (e.g., "AM" or "PM"), then the system may determine that one or more of the training instances can be labeled (or relabeled if the one or more terms are associated with another, distinct feature). If, at an iteration of block 660, the system determines that one or more of the missing and/or mislabeled features can be automatically labeled and/or relabeled, then the system may automatically relabel one or more of the mislabeled features and proceed to block 666. Block 666 is described below. If, at an iteration of block 660, the system determines that the one or more of the missing and/or mislabeled features cannot be automatically labeled and/or relabeled, then the system may proceed to block 662.

At block 662, the system causes a notification that requests a third-party developer that is associated with the third-party to relabel the one or more mislabeled features for corresponding training instances in the corpus and/or to add one or more missing features to corresponding training instances in the corpus to be presented to the user. The notification can be presented to the user via a user interface associated with the voice development platform, and can be presented to the user visually and/or audibly via a client device of the third-party developer. In some implementations, the notification can include an indication of the behavioral error identified at block 656, an indication that one or more training instances need to be labeled and/or relabeled, an indication of one or more portions of the one or more training instances need to be labeled and/or relabeled, an indication of whether one or more training instances were automatically labeled and/or relabeled by the system, and/or other information.

At block 664, the system determines whether user input is received from the third-party developer that relabels one or more of the mislabeled features and/or that adds labels for one or more missing features. User input may be continuously received at block 664 until the one or more mislabeled features are relabeled and/or the one or more missing features are labeled. When the third-party developer is done relabeling one or more of the mislabeled features and/or that adding labels for one or more of the missing features, the voice bot can be updated based on at least the corresponding training instances having features that were labeled and/or relabeled, and the system may proceed to block 666. The voice bot can be updated based at least in part on one or more of the synthesized training instances and/or one or more of the training instances added by the third-party developer in the same or similar manner described above with respect to FIGS. 2 and 3B.

At block 666, the system determines whether the updated voice bot is validated. The system may determine that the updated voice bot is validated when one or more conditions are satisfied. The voice bot can be validated in the same or similar manner described with respect to block 568 of FIG. 5. If, at an iteration of block 666, the system determines that the updated voice bot is not validated, then the system may return to block 658 to identify one or more additional missing and/or mislabeled features in the corpus and repeat the operations of block 658-664 to further update the trained voice bot. If, at an iteration of block 666, the system determines that the updated voice bot is validated, then the system may proceed to block 668.

At block 668, the system may cause the updated voice bot to be deployed for conducting conversations on behalf of the third-party. For example, the updated voice bot can be deployed to answer incoming telephone calls and/or initiate outgoing telephone calls, on behalf of the third-party, and conduct conversations with corresponding humans during the telephone calls, interact with a human at a drive thru, serve as an automated assistant, and/or be deployed to conduct any conversations, on behalf of the third-party, for human-to-computer dialogs on behalf of the third-party.

Figure 7:
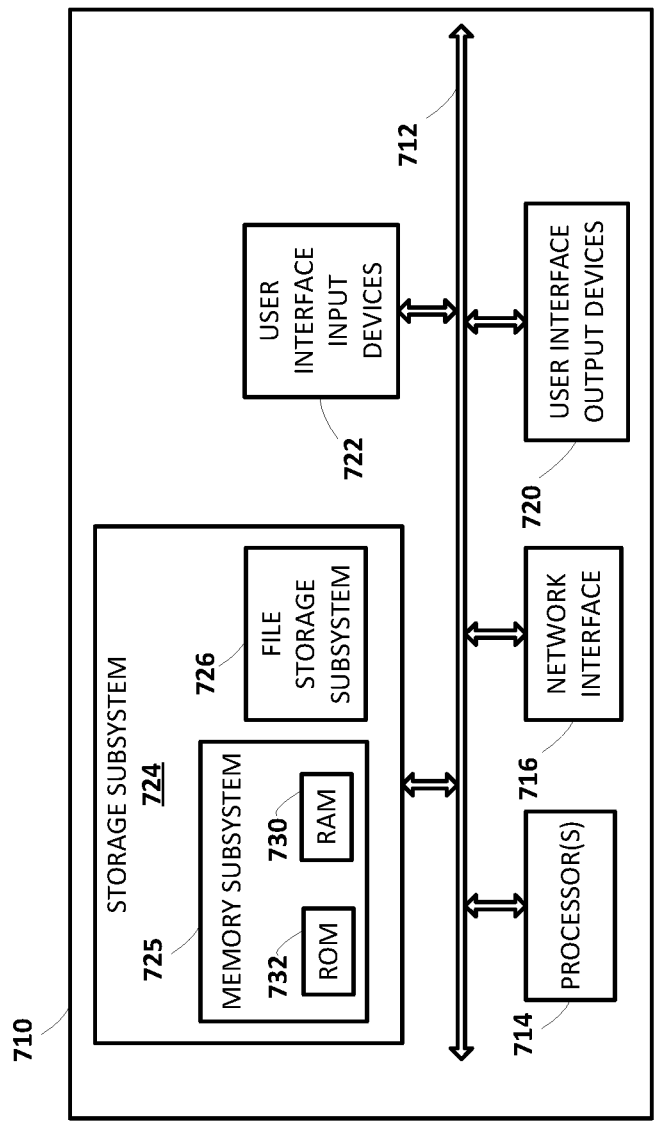
FIG. 7 depicts an example architecture of a computing device, in accordance with various implementations.

FIG. 7 is a block diagram of an example computing device 710 that may optionally be utilized to perform one or more aspects of techniques described herein. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes identifying, via a bot development system, a trained voice bot that is associated with a third-party and a corpus of training instances utilized to train the trained voice bot; and obtaining, via the voice bot development system, voice bot activity for the trained voice bot. The voice bot activity includes a plurality of previously conducted conversations between the trained voice bot, on behalf of the third-party, and a corresponding human, and each of the previously conducted conversations include at least a corresponding conversation and a corresponding prior context for one or more portions of the corresponding conversation. The method further includes identifying, via the voice bot development system, and based on processing the plurality of previously conducted conversations, a given behavioral error of the trained voice bot; determining, via the voice bot development system, and based on the given behavioral error of the trained voice bot, an action that is directed to correcting the given behavioral error of the trained voice bot; and causing a notification to be presented to a third-party developer, via a user interface of the bot development system, based on the action that is directed to correcting the given behavioral error of the trained voice bot, wherein the third-party developer is associated with the trained voice bot.

These and other implementations of technology disclosed herein can optionally include one or more of the following features.

In some implementations, identifying the given behavioral error of the trained voice bot may include processing, using a plurality of machine learning (ML) layers of a ML model, one or more of the portions of a given corresponding conversation, of the plurality of previously conducted conversations, and a given corresponding prior context of the given corresponding conversation for one or more of the portions of the given corresponding conversation to identify the given behavioral error; and processing, using the plurality of ML layers of the ML model or an additional plurality of ML layers of the ML model or an additional ML model, the given behavioral error to classify the given behavioral error into one or more disparate categories of behavioral errors.

In some versions of those implementations, the method may further include obtaining, via the voice bot development system, an embedding generated during the given corresponding conversation based on at least one or more of the portions of the given corresponding conversation and the given corresponding prior context of the given corresponding conversation; and identifying, via the voice bot development platform, and based on the embedding, one or more of the training instances, included in the corpus of training instances utilized to train the trained voice bot, that are associated with the given behavioral error.

In some further versions of those implementations, identifying the one or more training instances that are associated with the given behavioral error based on the embedding may include obtaining, via the voice bot development system, a corresponding embedding associated with each of the one or more training instances; comparing, via the voice bot development system, and in embedding space, the embedding generated during the given corresponding conversation with the corresponding embedding associated with each the one or more training instances; determining, based on the comparing, a corresponding distance metric between the embedding generated during the given corresponding conversation and the corresponding embedding associated with each the one or more training instances; and identifying, via the voice bot development system, and based on the corresponding distance metrics, the one or more training instances that are associated with the given behavioral error.

In some versions of those implementations, determining the action that is directed to correcting the given behavioral error of the trained voice bot may be based on a given category, of the one or more of disparate categories, into which the given behavioral error of the trained voice bot is classified.

In some further versions of those implementations, the given category may be associated with a mislabeled feature category that indicates one or more of the training instances, included in the corpus utilized to train the trained voice bot, have mislabeled features. In yet further versions of those implementations, the action that is directed to correcting the given behavioral error of the trained voice bot may include relabeling one or more features of one or more of the training instances, wherein the relabeling of one or more of the features of one or more of the training instances is automatically performed by the voice bot development system, and wherein the notification presented to the third-party developer includes an indication of: the given behavioral error identified by the voice bot development system, and the action that is directed to correcting the given behavioral error of the trained voice bot the given behavioral error that was automatically performed by the voice bot development system. In even further versions of those implementations, the notification presented to the third-party developer may include an indication of: the given behavioral error identified by the voice bot development system, one or more of the training instances, and a request for the third-party developer to perform the relabeling of one or more of the features of one or more of the training instances. In even yet further versions of those implementations, the notification may be presented to the developer in response to determining the voice bot development platform cannot relabel one or more of the features of one or more of the training instances.

In additional or alternative further versions of those implementations, the given category may be associated with a missing feature category that indicates one or more of the training instances, included in the corpus utilized to train the trained voice bot, have missing features. In yet further versions of those implementations, the notification presented to the third-party developer may include an indication of: the given behavioral error identified by the voice bot development system, one or more of the training instances, and a request for the third-party developer to label one or more of the features of one or more of the training instances.

In additional or alternative further versions of those implementations, the given category may be associated with a sparsity category that indicates one or more additional training instances having a particular feature need to be added to the corpus utilized to train the trained voice bots. In yet further versions of those implementations, the action that is directed to correcting the given behavioral error of the trained voice bot may include synthesizing one or more of additional training instances. Synthesizing one or more of the additional training instances may be automatically performed by the voice bot development system, and the notification presented to the third-party developer includes an indication of: the given behavioral error identified by the voice bot development system, and the action that is directed to correcting the given behavioral error of the trained voice bot the given behavioral error that was automatically performed by the voice bot development system. In additional or alternative versions of those yet further implementations, the notification presented to the third-party developer may include an indication of: the given behavioral error identified by the voice bot development system, the particular feature, and a request for the third-party developer to add one or more of the additional training instances that include the particular feature.

In some implementations, the action that is directed to correcting the given behavioral error may include updating the corpus of training instances utilized to train the trained voice bot to generate an updated corpus. Updating the corpus of training instances utilized to train the trained voice bot to generate the updated corpus may include modifying one or more training instances included in the corpus of training instances utilized to train the trained voice bot; or adding one or more additional training instances to the corpus of training instances utilized to train the trained voice bot. In some versions of those implementations, the method may further include subsequent to updating the corpus of training instances utilized to train the trained voice bot: causing the trained voice bot to be updated based on the updated corpus of training instances to generate an updated voice bot; and causing the updated voice to be deployed for conducting additional conversation on behalf of the third-party.

In some further versions of those implementations, causing the trained voice bot to be updated based on the updated corpus of training instances to generate the updated voice bot may be in response to receiving, via a user interface of the voice bot development system, user input to update the trained voice bot. In some additional or alternative further versions of those implementations, the method may further include, subsequent to causing the trained voice bot to be updated and prior to causing the updated voice bot to be deployed, validating the updated voice bot to determine whether the given behavioral error has been corrected. Causing the updated voice to be deployed may be in response to determining that the given behavioral error has been corrected.

In some implementations, the notification presented to the third-party developer includes an indication of: the given behavioral error identified by the voice bot development system, and a request that the third-party developer perform the action that is directed to correcting the given behavioral error of the trained voice bot. In some versions of those implementations, the indication of the request that the third-party developer perform the action that is directed to correcting the given behavioral error of the trained voice bot may be included in the notification in response to determining that the voice bot development system cannot automatically perform the action that is directed to correcting the given behavioral error of the trained voice bot. In some additional or alternative versions of those implementations, the method may further include receiving, via a user interface of the voice bot development system, and responsive to the notification being presented to the third-party developer, user input from the third-party developer to perform the action that is directed to correcting the given behavioral error of the trained voice bot.

In some implementations, determining the action that is directed to correcting the given behavioral error of the trained voice bot may be in response to determining a quantity of occurrences of the given behavioral error satisfies a quantity threshold.

In some implementations, a method implemented by one or more processors is provided, and includes identifying, via a bot development system, a trained voice bot that is associated with a third-party and a corpus of training instances utilized to train the trained voice bot; and obtaining, via the voice bot development system, voice bot activity for the trained voice bot. The voice bot activity includes a plurality of previously conducted conversations between the trained voice bot, on behalf of the third-party, and a corresponding human, and each of the previously conducted conversations include at least a corresponding conversation and a corresponding prior context for one or more portions of the corresponding conversation. The method further includes determining, via the voice bot development system, and based the plurality of previously conducted conversations, the trained voice bot does not include a desired behavior; generating, via the voice bot development platform, a notification that indicates one or more additional training instances need to be added to the corpus of training instances to generate an updated corpus of training instances, the one or more additional training instances being associated with the desired behavior; causing the notification to be presented to a third-party developer associated with the third-party, via a user interface of the bot development system; and subsequent to obtaining the one or more additional training instances: causing the trained voice to be updated based on the updated corpus of training instances to generate an updated voice bot; and causing the updated voice bot to replace the trained voice bot for conducting additional conversations on behalf of the third-party.

These and other implementations of technology disclosed herein can optionally include one or more of the following features.

In some implementations, the notification that indicates one or more additional training instances need to be added to the corpus of training instances may include a request that the third-party developer provide one or more of the additional training instances. In some versions of those implementations, obtaining the one or more additional training instances may include receiving, via the voice bot development platform, user input that defines one or more of the additional training instances that are associated with the desired behavior, the user input being received responsive to the notification. The one or more additional training instances may include a feature emphasis input that was not previously defined in the training instances of the corpus.

In some implementations, the trained voice bot may correspond to one or more processors that utilize a plurality of machine learning (ML) layers, of one or more ML models. In some versions of those implementations, causing the trained voice bot to be updated based on the updated corpus of training instances to generate the updated voice bot may include causing corresponding weights of one or more of the plurality of ML layers to be updated based on processing the one or more additional training instances; and causing additional corresponding weights of one or more of the plurality of ML layers to be fixed.

In some implementations, a method implemented by one or more processors is provided, and includes identifying, via a bot development system, a trained voice bot that is associated with a third-party and a corpus of training instances utilized to train the trained voice bot; and obtaining, via the voice bot development system, voice bot activity for the trained voice bot. The voice bot activity includes a plurality of previously conducted conversations between the trained voice bot, on behalf of the third-party, and a corresponding human, and each of the previously conducted conversations include at least a corresponding conversation and a corresponding prior context for one or more portions of the corresponding conversation. The method further includes identifying, via the voice bot development system, and based on processing the plurality of previously conducted conversations, a given behavioral error of the trained voice bot; determining, via the voice bot development system, and based on the given behavioral error of the trained voice bot, that one or more features are missing or mislabeled for one or more corresponding training instances included in the corpus; and causing a notification to be presented to a third-party developer, via a user interface of the bot development system, a notification that indicates one or more of the features are missing or mislabeled for one or more of the corresponding training instances included in the corpus.

These and other implementations of technology disclosed herein can optionally include one or more of the following features.

In some implementations, the notification that indicates one or more features are missing or mislabeled for one or more corresponding training instances may include a request that the third-party developer add labels or relabel for one or more corresponding training instances.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   identifying, via a bot development system, a trained voice bot that is associated with a third-party and a corpus of training instances utilized to train the trained voice bot;
   obtaining, via the voice bot development system, voice bot activity for the trained voice bot, wherein the voice bot activity includes a plurality of previously conducted conversations between the trained voice bot, on behalf of the third-party, and a corresponding human, and wherein each of the previously conducted conversations include at least a corresponding conversation and a corresponding prior context for one or more portions of the corresponding conversation;
   identifying, via the voice bot development system, and based on processing the plurality of previously conducted conversations, a given behavioral error of the trained voice bot, wherein identifying the given behavioral error of the trained voice bot comprises:
      processing, using a plurality of machine learning (ML) layers of a ML model, one or more of the portions of a given corresponding conversation, of the plurality of previously conducted conversations, and a given corresponding prior context of the given corresponding conversation for one or more of the portions of the given corresponding conversation to identify the given behavioral error; and
      processing, using the plurality of ML layers of the ML model or an additional plurality of ML layers of the ML model or an additional ML model, the given behavioral error to classify the given behavioral error into one or more disparate categories of behavioral errors;
   determining, via the voice bot development system, and based on the given behavioral error of the trained voice bot, an action that is directed to correcting the given behavioral error of the trained voice bot; and
   causing a notification to be presented to a third-party developer, via a user interface of the bot development system, based on the action that is directed to correcting the given behavioral error of the trained voice bot, wherein the third-party developer is associated with the trained voice bot.

2. The method of claim 1, further comprising:
   obtaining, via the voice bot development system, an embedding generated during the given corresponding conversation based on at least one or more of the portions of the given corresponding conversation and the given corresponding prior context of the given corresponding conversation; and
   identifying, via the voice bot development platform, and based on the embedding, one or more of the training instances, included in the corpus of training instances utilized to train the trained voice bot, that are associated with the given behavioral error.

3. The method of claim 2, wherein identifying the one or more training instances that are associated with the given behavioral error based on the embedding comprises:
   obtaining, via the voice bot development system, a corresponding embedding associated with each of the one or more training instances;
   comparing, via the voice bot development system, and in embedding space, the embedding generated during the given corresponding conversation with the corresponding embedding associated with each the one or more training instances;

determining, based on the comparing, a corresponding distance metric between the embedding generated during the given corresponding conversation and the corresponding embedding associated with each the one or more training instances; and identifying, via the voice bot development system, and based on the corresponding distance metrics, the one or more training instances that are associated with the given behavioral error.

4. The method of claim 1, wherein determining the action that is directed to correcting the given behavioral error of the trained voice bot is based on a given category, of the one or more of disparate categories, into which the given behavioral error of the trained voice bot is classified.

5. The method of claim 4, wherein the given category is associated with a mislabeled feature category that indicates one or more of the training instances, included in the corpus utilized to train the trained voice bot, have mislabeled features.

6. The method of claim 5, wherein the action that is directed to correcting the given behavioral error of the trained voice bot comprises relabeling one or more features of one or more of the training instances, wherein the relabeling of one or more of the features of one or more of the training instances is automatically performed by the voice bot development system, and wherein the notification presented to the third-party developer includes an indication of:

the given behavioral error identified by the voice bot development system, and the action that was automatically performed by the voice bot development system.

7. The method of claim 5, wherein the notification presented to the third-party developer includes an indication of:

the given behavioral error identified by the voice bot development system, one or more of the training instances, and a request for the third-party developer to perform the relabeling of one or more of the features of one or more of the training instances.

8. The method of claim 7, wherein the notification is presented to the developer in response to determining the voice bot development platform cannot relabel one or more of the features of one or more of the training instances.

9. The method of claim 4, wherein the given category is associated with a missing feature category that indicates one or more of the training instances, included in the corpus utilized to train the trained voice bot, have missing features.

10. The method of claim 9, wherein the notification presented to the third-party developer includes an indication of:

the given behavioral error identified by the voice bot development system, one or more of the training instances, and a request for the third-party developer to label one or more of the features of one or more of the training instances.

11. The method of claim 4, wherein the given category is associated with a sparsity category that indicates one or more additional training instances having a particular feature need to be added to the corpus utilized to train the trained voice bots.

12. The method of claim 11, wherein the action that is directed to correcting the given behavioral error of the trained voice bot comprises synthesizing one or more of additional training instances, wherein synthesizing one or more of the additional training instances is automatically performed by the voice bot development system, and wherein the notification presented to the third-party developer includes an indication of:

the given behavioral error identified by the voice bot development system, and the action that is directed to correcting the given behavioral error of the trained voice bot the given behavioral error that was automatically performed by the voice bot development system.

13. The method of claim 11, wherein the notification presented to the third-party developer includes an indication of:

the given behavioral error identified by the voice bot development system, the particular feature, and a request for the third-party developer to add one or more of the additional training instances that include the particular feature.

14. The method of claim 1, wherein the action that is directed to correcting the given behavioral error comprises updating the corpus of training instances utilized to train the trained voice bot to generate an updated corpus, and wherein updating the corpus of training instances utilized to train the trained voice bot to generate the updated corpus comprises:

modifying one or more training instances included in the corpus of training instances utilized to train the trained voice bot; or adding one or more additional training instances to the corpus of training instances utilized to train the trained voice bot.

15. The method of claim 1, wherein the notification presented to the third-party developer includes an indication of:

the given behavioral error identified by the voice bot development system, and a request that the third-party developer perform the action that is directed to correcting the given behavioral error of the trained voice bot.

16. The method of claim 1, wherein determining the action that is directed to correcting the given behavioral error of the trained voice bot is in response to determining a quantity of occurrences of the given behavioral error satisfies a quantity threshold.

17. A method implemented by one or more processors, the method comprising:

identifying, via a bot development system, a trained voice bot that is associated with a third-party and a corpus of training instances utilized to train the trained voice bot;

obtaining, via the voice bot development system, voice bot activity for the trained voice bot, wherein the voice bot activity includes a plurality of previously conducted conversations between the trained voice bot, on behalf of the third-party, and a corresponding human, and wherein each of the previously conducted conversations include at least a corresponding conversation and a corresponding prior context for one or more portions of the corresponding conversation;

identifying, via the voice bot development system, and based on processing the plurality of previously conducted conversations, a given behavioral error of the trained voice bot, wherein identifying the given behavioral error of the trained voice bot comprises:

processing, using a plurality of machine learning (ML) layers of a ML model, one or more of the portions of a given corresponding conversation, of the plurality of previously conducted conversations, and a given corresponding prior context of the given corresponding conversation for one or more of the portions of the given corresponding conversation to identify the given behavioral error; and processing, using the plurality of ML layers of the ML model or an additional plurality of ML layers of the ML model or an additional ML model, the given behavioral error to classify the given behavioral error into one or more disparate categories of behavioral errors;

determining, via the voice bot development system, and based on the given behavioral error of the trained voice bot, that one or more features are missing or mislabeled for one or more corresponding training instances included in the corpus; and causing a notification to be presented to a third-party developer, via a user interface of the bot development system, a notification that indicates one or more of the features are missing or mislabeled for one or more of the corresponding training instances included in the corpus.

18. A voice bot development system, the voice bot development system comprising:

one or more hardware processors; and memory storing instructions that, when executed by the one or more hardware processors, cause the one or more hardware processors to:

identify a trained voice bot that is associated with a third-party and a corpus of training instances utilized to train the trained voice bot;

obtain voice bot activity for the trained voice bot, wherein the voice bot activity includes a plurality of previously conducted conversations between the trained voice bot, on behalf of the third-party, and a corresponding human, and wherein each of the previously conducted conversations include at least a corresponding conversation and a corresponding prior context for one or more portions of the corresponding conversation;

identify, based on processing the plurality of previously conducted conversations, a given behavioral error of the trained voice bot, wherein the instructions to identify the given behavioral error of the trained voice bot comprise instructions to:

process, using a plurality of machine learning (ML) layers of a ML model, one or more of the portions of a given corresponding conversation, of the plurality of previously conducted conversations, and a given corresponding prior context of the given corresponding conversation for one or more of the portions of the given corresponding conversation to identify the given behavioral error; and process, using the plurality of ML layers of the ML model or an additional plurality of ML layers of the ML model or an additional ML model, the given behavioral error to classify the given behavioral error into one or more disparate categories of behavioral errors;

determine, based on the given behavioral error of the trained voice bot, an action that is directed to correcting the given behavioral error of the trained voice bot; and cause a notification to be presented to a third-party developer, via a user interface of the bot development system, based on the action that is directed to correcting the given behavioral error of the trained voice bot, wherein the third-party developer is associated with the trained voice bot.

* * * * *